(12) United States Patent
Gregg et al.

(10) Patent No.: US 6,516,416 B2
(45) Date of Patent: *Feb. 4, 2003

(54) SUBSCRIPTION ACCESS SYSTEM FOR USE WITH AN UNTRUSTED NETWORK

(75) Inventors: Richard L. Gregg, Omaha, NE (US); Sandeep Giri, Omaha, NE (US); Timothy C. Goeke, Elkhorn, NE (US)

(73) Assignee: Prism Resources, Omaha, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,710

(22) Filed: Jun. 11, 1997

(65) Prior Publication Data

US 2002/0002688 A1 Jan. 3, 2002

(51) Int. Cl.[7] .................................................. H04L 9/00
(52) U.S. Cl. ......................................... 713/201; 705/51
(58) Field of Search ............................. 380/25, 21, 49, 380/30; 713/202, 201, 200; 705/54, 51

(56) References Cited

U.S. PATENT DOCUMENTS 5,629,980 A * 5/1997 Stefik et al. .................. 705/54
5,677,953 A * 10/1997 Dolphin ........................ 380/4
5,708,780 A * 1/1998 Levergood et al. ......... 709/229
5,765,152 A * 6/1998 Erickson ........................ 707/9
6,006,332 A * 12/1999 Rabne et al. ............... 713/201

* cited by examiner

Primary Examiner—Matthew Smithers
(74) Attorney, Agent, or Firm—Greer, Burns & Crain, Ltd.

(57) ABSTRACT

A system and method is disclosed for controlling access to computer resources using an untrusted network. The system preferably uses a hardware key connected to each subscriber client computer and adds software to the subscriber client computer and to the existing server computer. A clearinghouse is provided to store client and server identification data, including demographic data, including URL data, usage data and billing information. The clearinghouse authenticates the subscriber and server computers before an operating session occurs. For every new client session, a login mechanism requires the client computer to supply appropriate identification data, including a digital identification generated by the hardware key. The login parameters are verified by the clearinghouse and a session is then started. The system is adapted to protect preselected content from being printed or copied by a client using a web browser. The system architecture permits a geographical distributed system of multiple subscriber client computers, multiple server computers and multiple clearinghouses which can interact with each other.

31 Claims, 24 Drawing Sheets

FIG. 7
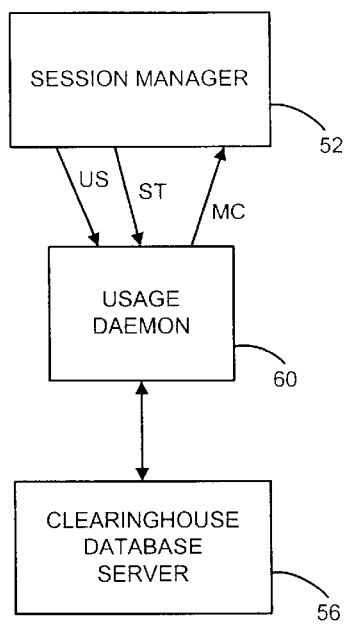
FIG. 8
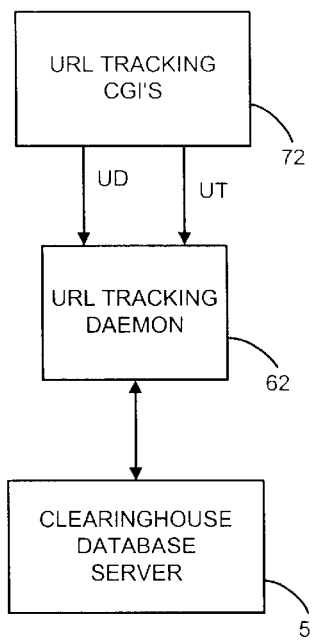
FIG. 9
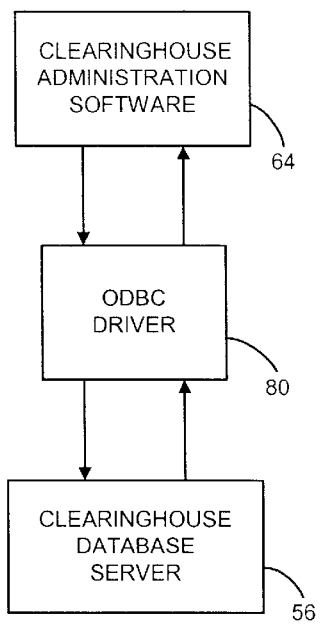
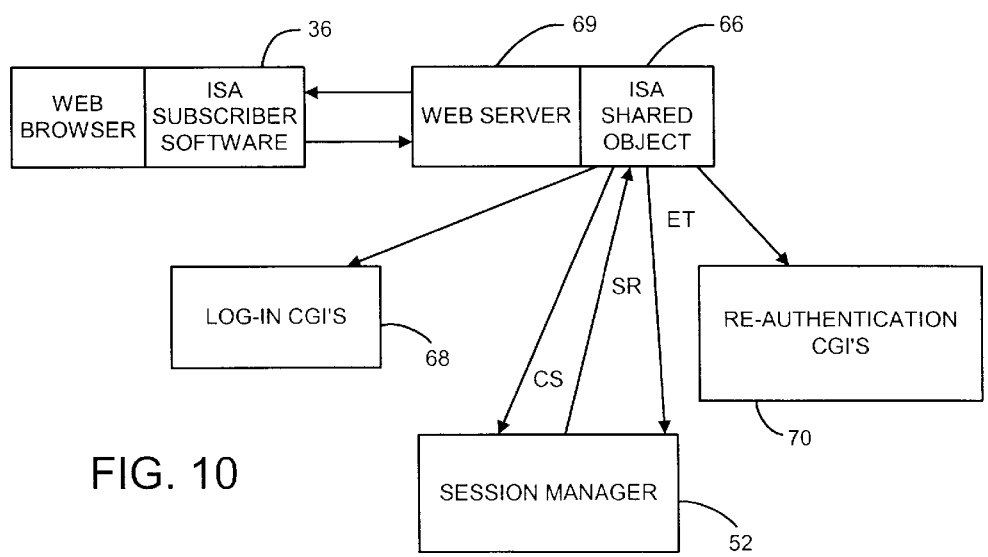
FIG. 10

LOG-IN, USER AUTHENTICATION, AND SESSION INITIATION

EXAMPLE COPYRIGHT PROTECTION IN WEB ENVIRONMENT

ACCESS KEY BLOCK DIAGRAM

SUBSCRIPTION ACCESS SYSTEM FOR USE WITH AN UNTRUSTED NETWORK

The present invention generally relates to security systems for use with computer networks and more particularly to a subscription access system that is particularly adapted for use with untrusted networks, such as the Internet.

There are many information providers which are connected to the Internet or some other untrusted network. Such information providers may provide information without charge for certain information that can be accessed by any user that has access to the network. However, the same information provider may want to generate revenue from subscription services and also to protect its information assets. In order to generate revenue, there must be control over user access, rights management, billings, usage tracking and even demographic data. For an information provider to publish content on an untrusted network such as the web, it must have access to a web server which connects to the Internet. Any user with a web browser can then access the web site and view its contents. If an organization is a private corporate network and wants to display parts of its corporate data on its web site, the organization can make the private network available to the web server through a firewall computer. This enables the corporate data that is desired to be displayed without the private network being accessible to the rest of the web.

To implement a subscription access system for use over the web, information providers need to implement authentication and usage tracking. Authentication involves providing restricted access to the contents that are made available and this is typically implemented through traditional user name-password schemes. Such schemes are vulnerable to password fraud because subscribers can share their user names and password by word of mouth or through Internet news groups, which obviously is conducive to fraudulent access and loss of revenue. Usage tracking involves collecting information on how subscribers are using a particular subscription web site, which typically now involves web server access logs which tell what web resources were accessed by particular addresses. This information is often inadequate to link web site usage and a particular subscriber who used the web site. There is also no generic transaction model that defines a web transaction, which contributes to the difficulty in implementing a subscription model based upon usage.

Accordingly, it is a primary object of the present invention to provide an improved subscription access system for use in an untrusted network, such as the Internet, which system provides effective authentication and usage tracking, among other features.

Another object of the present invention is to provide such an improved subscription access system which provides additional features that combine elements of subscriber authentication, subscriber authorization, demographics capture and rights management to effectively protect the assets of an online information provider.

More particularly, it is an object of the present invention to provide such an improved subscription access system that provides secure access through either a one factor (conventional user name and password) or two factor authentication (using an optional hardware access key with a unique digital ID), thus enabling a superior and effective subscriber authentication which only allows registered subscribers to access protected contents and subscriber authorization which determines the subscriber's access level within a protected site.

Yet another object of the present invention is to provide such a system that has usage tracking capability for collecting all of the subscriber's usage data and storing it in a structured query language (SQL) database under a generic transaction model.

Another object of the present invention is to provide such a system which enables demographic capture to store a subscriber's network usage history.

Still another object of the present invention is to provide such a system that has the capability of preventing content from being copied by controlling the functionality of a client application, such as a web browser, while displaying protected contents. More particularly, the functionality is controlled in a manner whereby copyrighted content, for example, can be identified and the client application can be controlled to preclude such functionality as cut and paste, copy or print. Such functionality can be controlled on a hierarchical basis.

Still another object of the present invention is to provide such a system that easily administers subscriptions and subscribers through a graphical user interface client/server application.

Other objects and advantages will become apparent upon reading the following detailed description, while referring to the attached drawings.

DESCRIPTION OF THE DRAWINGS

FIG. 7 is a block diagram illustrating the structure and operation of the clearinghouse usage daemon of the preferred embodiment;

FIG. 8 is a block diagram illustrating the structure and operation of the clearinghouse URL tracking daemon of the preferred embodiment;

FIG. 9 is a functional block diagram illustrating the structure and operation of the clearinghouse administration software of the preferred embodiment;

FIG. 10 is a functional block diagram illustrating the structure and operation of the server shared object of the preferred embodiment;

DETAILED DESCRIPTION

Broadly stated, the present invention is directed to a subscription access system that is particularly adapted for use with an untrusted network, such as the Internet worldwide web. As used herein, an untrusted network is defined as a public network with no controlling organization, with the path to access the network being undefined and the user being anonymous. A client-server application running over such a network has no control over the transmitted information during all the phases of transmission. The present invention provides a platform to securely publish subscription contents on a web site and because of its superior design and operation, is capable of operating with multiple servers and with multiple clearinghouses. The present invention implements its platform by restricting subscription contents to subscribers only, and by tracking their usage in a generic transaction model that can be easily integrated to any subscription billing model.

Figure 1:
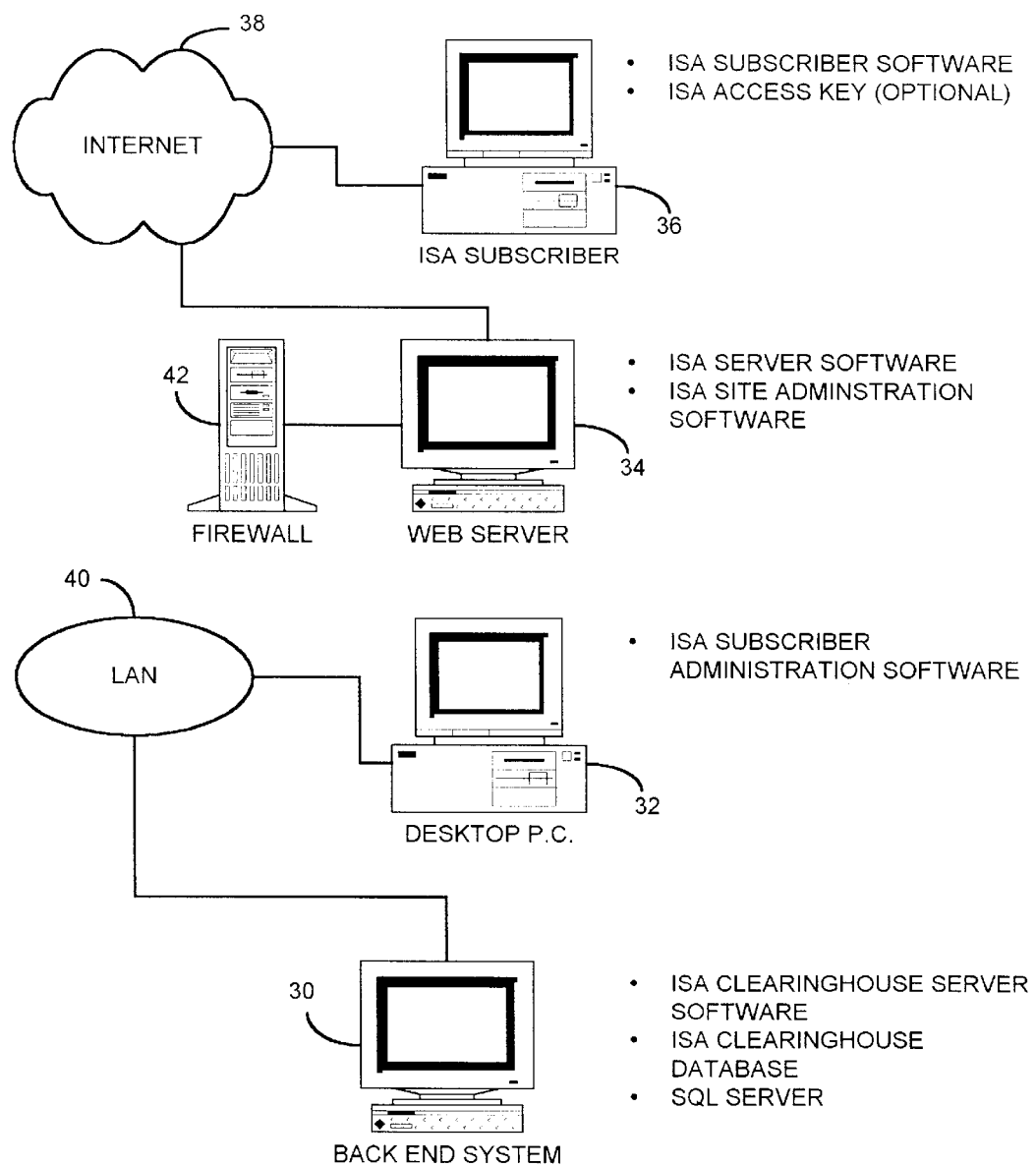
FIG. 1 is a block diagram of the subscription access system embodying the present invention, wherein a subscription access server is part of a local area network, with the server being connected to the Internet and to the local area network via a firewall.

The system has four major components as shown in FIG. 1, which are a subscription access clearinghouse, indicated generally at 30; a subscription access subscriber administration software, shown generally at 32; a subscription access server, indicated generally at 34; and a number of subscription access subscriber software, one of which is shown generally at 36. The subscribers are connected to the Internet 38 via a modem connection or a similar means, and the Internet 38 has a connection to the server. The server 34 is connected to a local area network (LAN) 40 through a firewall computer 42. A firewall is used to separate a local area network from the outside world. In general, a local area network is connected to the outside world by a "Gateway" computer. This Gateway machine can be converted into a firewall by installing special software that does not let unauthorized TCP/IP packets passed from inside to outside and vice versa. The LAN 40 also provides a connection to the subscriber administration software 32 and to the clearinghouse 30. While the configuration shown in FIG. 1 has a single subscription access server 34 and a single clearinghouse server 30, the subscription access system of the present invention is adapted to be used in other configurations, which may include multiple subscription access servers being controlled by a single clearinghouse 30 or multiple subscription access servers which interact with multiple clearinghouses 30. Such flexibility in configurations is an extremely desirable aspect of the present invention.

With respect to the major components of the system as shown in FIG. 1, the clearinghouse 30 preferably resides on a back office platform in a corporate network. It has a secure interface to communicate with the subscription access servers 34 which reside on the same machine which hosts the web server. The subscriber software 36 on the other hand, resides on the subscriber's desktop machine. The clearinghouse server 35 is preferably a Sun UNIX server which runs the clearinghouse server processes and the database server. However, the database server could reside on a separate machine. The clearinghouse 30 is the entity that hosts all of the subscription information and the subscriber information. It provides a secure interface to the subscription access servers 34 which enables the subscription access servers to authenticate subscribers and to send subscriber's usage data and universal resource locator (URL) tracking data to the clearinghouse 30. The clearinghouse consists of a structured query language (SQL) database which hosts the clearinghouse database as well as a user authentication server which authenticates subscribers on behalf of the subscription access servers and processes online applications. It also includes a usage server which collects usage data from the subscription access servers 34 and updates the clearinghouse database with it, and also includes a URL tracking server which collects URL tracking data from subscription access servers 34 to update the database. The clearinghouse also includes administration software 32 which provides a graphical user interface to administer the clearinghouse database.

With respect to the clearinghouse administration software 32, it preferably resides on a desktop PC running Windows95® and should be connected to the LAN 40 so that it can communicate with the clearinghouse database server 30 using an open database connectivity (ODBC) driver. This software will typically be on the LAN 40 of the organization so that database access through the administration software 32 is restricted within the organization. Using this administration software, an administer can define the business rules for subscription services and administer subscription demographic data and their usage data.

With respect to the subscription access server 34, the software for it is preferably located on the same machine that hosts the web server. It is preferably a Sun Solaris machine or comparable computer. The subscription access server 34 operates in conjunction with the clearinghouse 30 to authenticate and authorize subscribers and to track their usage data. The subscription access server 34 also interacts with the subscriber software at the subscriber computer 36 to provide demographic capture and intellectual property protection. The subscription access server 34 consists of a shared object which is incorporated as a part of the web server so that the server can protect contents as will be discussed. It also has a collection of common gateway interface programs (CGI's) which implement authentication tasks such as login and access key polling. A session manager is provided which builds sessions for every valid subscriber so that it can keep the transaction list that contains all of the tasks performed during a subscriber's session. The server 34 also includes a site administration software program that provides a web based visual interface to administer the session manager and maintain subscription profiles. The server 34 sends usage data to the clearinghouse 30 at the end of every subscriber's session and includes added functionality for enforcing content protection and processing online applications for subscriptions, as well as online activation of subscriptions.

The subscriber computer 36 includes software which enables a subscriber's web browser which is preferably a Netscape Navigator Version 3.0 or above or Microsoft Internet Explorer (Version 3.1 or above). The subscriber desktop PC should operate with Windows95® or Windows® 3.1/3.11 which runs the web browser and also includes subscription access subscriber software 36 which is part of the present invention that enables it to access enabled web sites. The subscriber software 36, in addition to enabling the access to a protected web site, also allows for enforcement of the intellectual property protection feature of the present invention, the login process, reauthentication process and URL tracking. All of these features are controlled by the subscription access server 34 which sends specific commands to the subscriber software 36 to perform the tasks as needed. The subscriber software 36 is preferably available as a plug in for the Netscape Navigator Version 3.0 or above or as an ActiveX component for Microsoft Internet Explorer (Version 3.1 or above). The subscriber preferably also includes an access key for providing two factor authentication. The access key comprises a hardware component containing an ASIC as having the structure illustrated in FIG. 28 and contains a unique digital identification that is microcoded into it.

The subscription access components preferably use transmission control protocol/internet protocol (TCP/IP) and user datagram protocol/internet protocol(UDP/IP) to communication with each other. Any communication that needs to go through the web server or the web browser will follow hyper text transfer protocol (HTTP) which is based on TCP/IP. These protocols are well known to those skilled in the art. The subscriber's PC accesses web sites using HTTP in the web server and subscription access server 34 communicate with each other using UDP/IP. The subscription access server 34 and the clearinghouse 30 preferably communicate with each other using TCP/IP and the clearinghouse servers communicate with a database using open database connectivity (ODBC) drivers most commonly over a TCP/IP network. The clearinghouse administration software 32 communicates with the database using an ODBC driver, most commonly over a TCP/IP or internet packet exchange (IPX) network.

The four main components of the preferred embodiment of the system as described with respect to FIG. 1 interact with one another using a distributed architecture which establishes a many-to-many relationship between the subscription access servers 34 and the clearinghouse 30. One clearinghouse 30 can be monitoring multiple subscription access servers 34 while each subscription access server is interacting with multiple subscribers 36. Similarly, a subscription access server 34 can be configured to interact with multiple clearinghouses 30.

Figure 2:
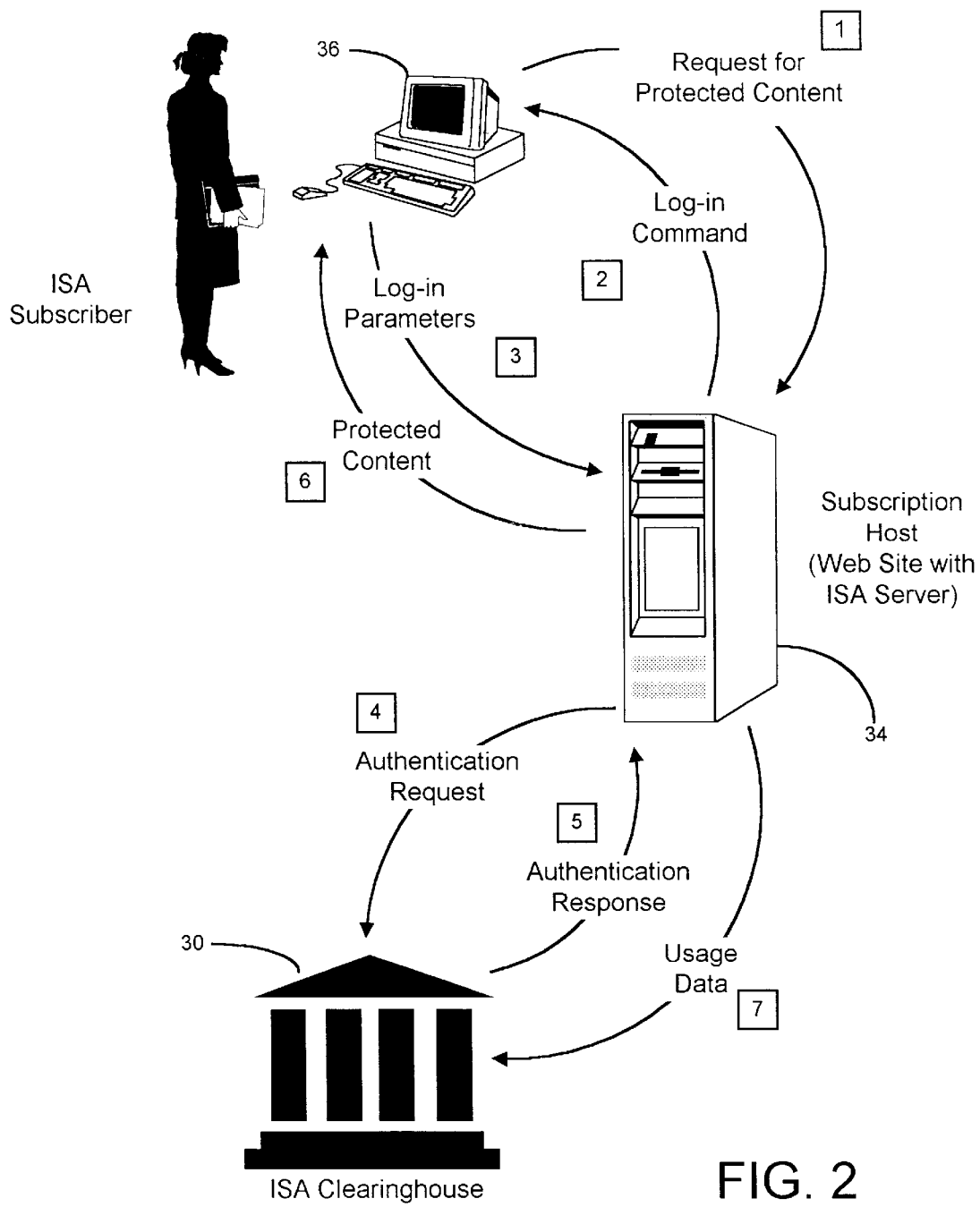
FIG. 2 is a functional block diagram of the subscription access system embodying the present invention and illustrating the functional interaction of components of the system and a subscriber.

The manner in which the preferred embodiment of the system operates in the web environment can be broadly seen by the functional block diagram of FIG. 2 which shows the clearinghouse server 30, the subscription access server 34, and the subscriber 36 with steps that are taken during a session. The first step is for the subscriber 36 to request protected content and that request is communicated to the subscription access server 34 which then commands the subscriber to login. The subscriber 36 inputs the login parameters which the subscription access server 34 then forwards to the clearinghouse 30. If the parameters are valid, a response is provided by the clearinghouse 30 to the subscription access server 34 which then communicates the protected content to the subscriber 36. The session usage data is eventually forwarded for storage by the clearinghouse 30.

Figure 3:
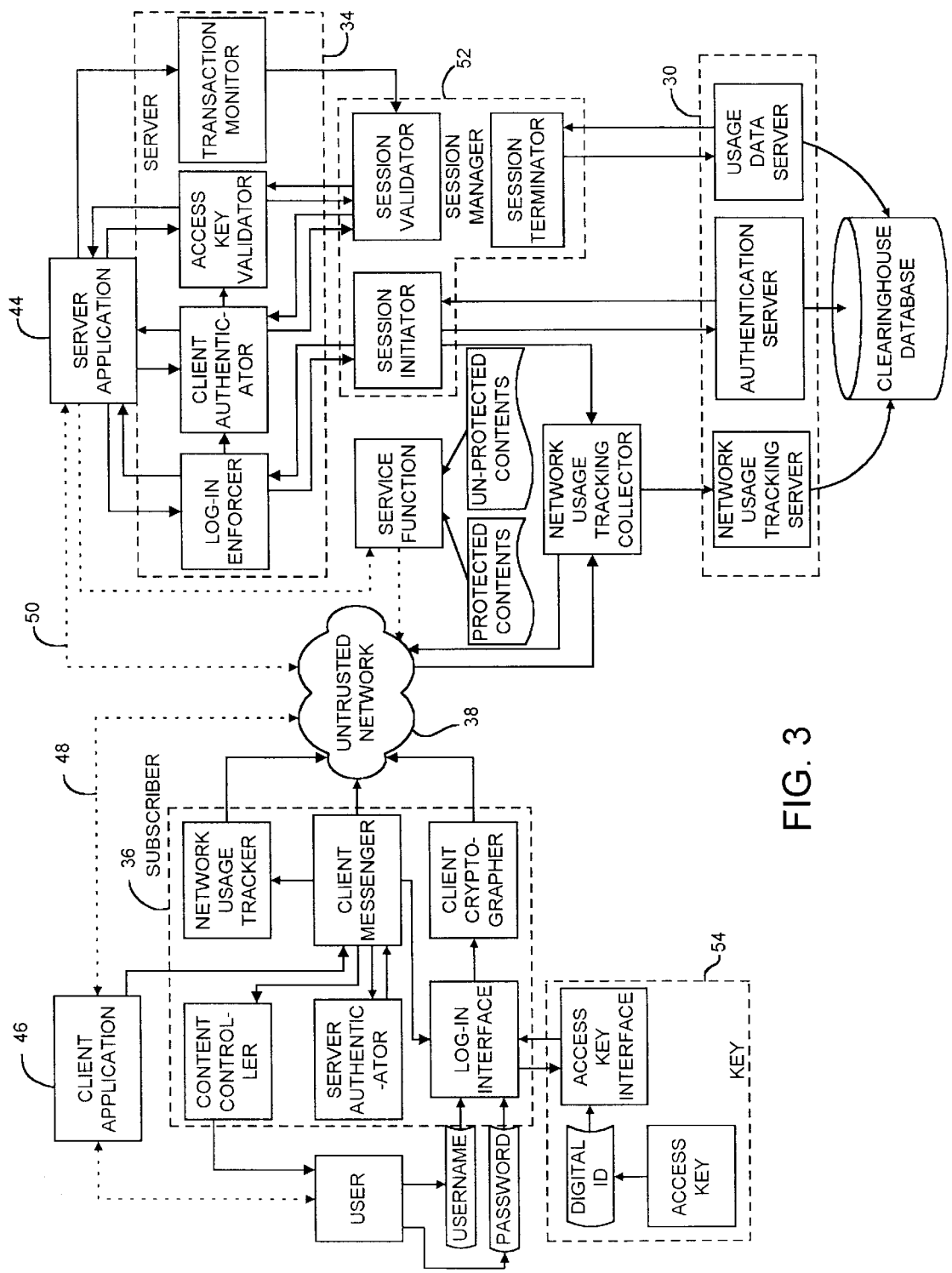
FIG. 3 is a more detailed block diagram of the schema of the present invention.

While the steps that have been described with respect to FIG. 2 are a very broad overview of the preferred embodiment, the functional block diagram of FIG. 3 provides a more detailed general schema of the present invention. The system includes a server application 44, a subscriber or client application 46, both of which are connected to an untrusted network via a traditional communication path indicated by the dotted lines 48 and 50. The system includes a session manager 52 for interacting with the clearinghouse 30 and the subscription access server 34 and an hardware access key 54 which is connected to the subscriber 36. The solid lines connecting the blocks of the numbered components of FIG. 3 represent secure communications whereas the dotted lines are conventional communication paths which may not be secure.

Rather than describe the functions of the blocks of FIG. 3, the manner in which these components function will be described in connection with FIGS. 17–23 which are more detailed flowcharts that relate to specific operations of the system.

Figure 4:
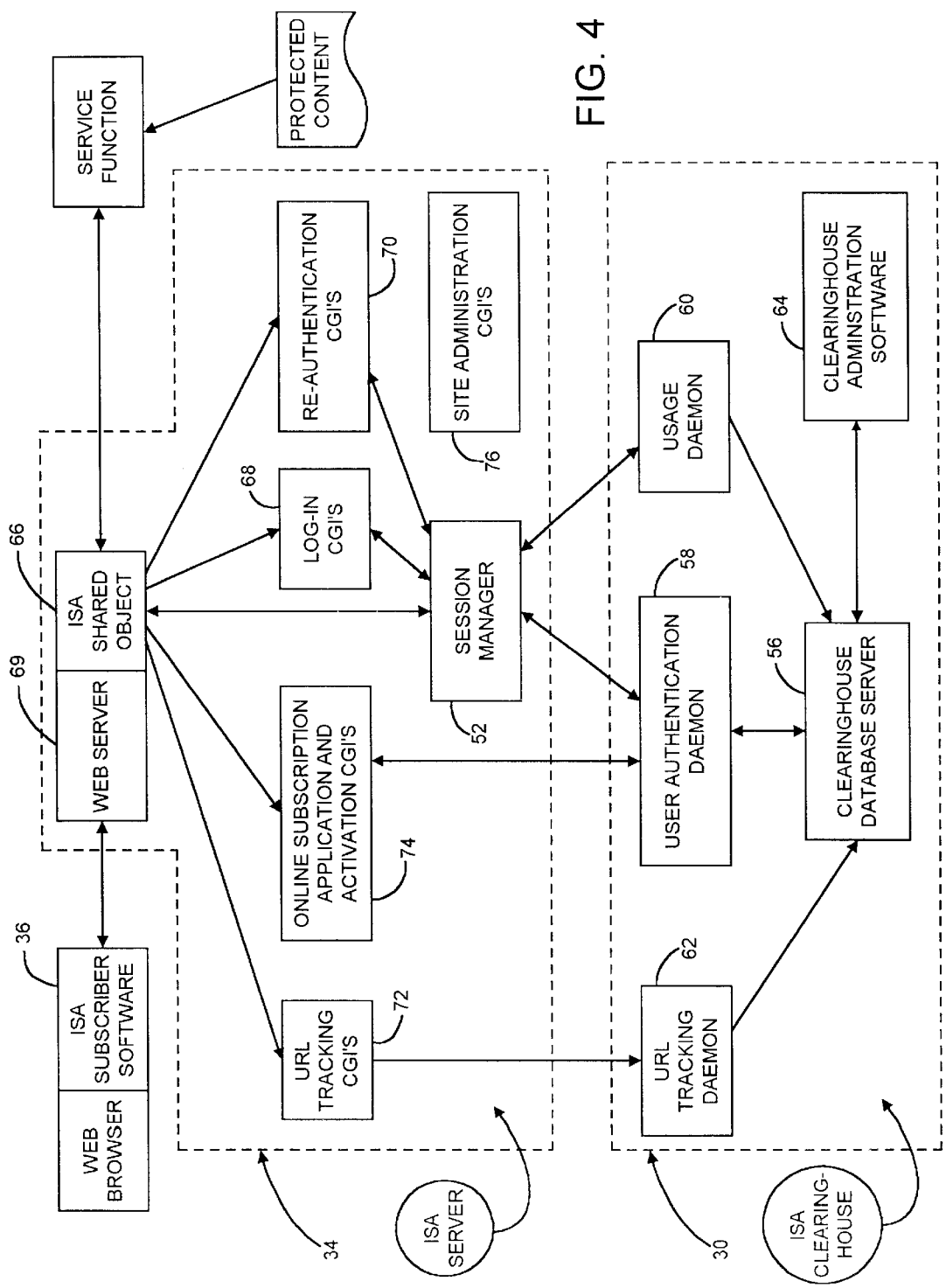
FIG. 4 is a software block diagram illustrating the system architecture of the preferred embodiment in the web environment, also known as the Internet Subscription Access (ISA) system.

The manner in which the system translates into the preferred embodiment in the web environment will be described in connection with the functional block diagram illustrated in FIG. 4. The clearinghouse 30 contains the subscription database, the usage and demographics data, storage capability and it controls the authentication and authorization of subscribers for individually enabled web servers. The clearinghouse includes a number of subcomponents, including a clearinghouse database server 56 which provides an ODBC interface to a SQL database that contains the subscription database and usage and demographics data warehouse.

The clearinghouse also has a user authentication daemon 58 that processes the requests for user authentication by subscription access servers 34. A daemon is a program that is not invoked explicitly, but lies dormant waiting for one or more necessary conditions to occur such as an incoming request from one of its client programs. For every user authentication request, the user authentication daemon first insures it is communicating with an authentic subscription access server 34, and then it queries the clearinghouse database server 56 to find the user's subscription information. Based on this information, it sends an authentication response back to the subscription access server 34. The user authentication daemon 58 also processes the subscription access server's request for online subscription application and online subscription activation. The clearinghouse 30 also includes a usage daemon 60 which is an independent server process that processes usage data update requests made by subscription access servers 34. Like the user authentication daemon, the usage daemon 60 authenticates subscription access servers 34 before processing their requests. Upon successful authentication, it will accept all of the usage data sent by a server and update the clearinghouse 30 database with it. The clearinghouse 30 also includes a universal resource locator (URL) tracking daemon 62 which is a server process that accepts URL tracking data sent by a subscription access server 34 and updates the clearinghouse database. The tracking daemon 62 also authenticates subscription access servers before processing their request. The clearinghouse 30 has administration software 64 which provides a visual interface on a Windows95® computer to administer the clearinghouse database.

With respect to the subscription access server 34, it runs in conjunction with a Netscape or Microsoft web server and is able to protect the contents using the system of the present invention. The subscription access server 34 authorizes each web transaction that involves subscription access protected content and does so by communicating with the subscriber software 36 to make the subscribers login. If the login is successful, the subscription access server 34 initiates a session and collects all usage data so that at the end of a session it can send the usage data to the clearinghouse 34. The subscription access server 34 also provides the functionality of session reauthentication, performs demographic tracking on subscribers, and implements intellectual property protection. The subscription access server software 32 includes a number of subcomponents including the session manager 52 which is a server process that processes messages sent by the subscription access shared object 66, subscription access common gateway interface programs (CGI's) and the clearinghouse 30.

When a subscriber 36 tries to log into a system enabled web site, the session manager 52 communicates with the clearinghouse 30 to authenticate the subscriber. If successful, the session manager 52 will start a new session for the user and from that point on, the subscriber 36 can access protected contents. Each web transaction during the session is reported to the session manager 52 by the shared object 66 so that the session manager 52 can build a list of transactions for the user. At the end of the session, the session manager 52 will send all of the session data and transaction data to the clearinghouse 30 to update the database. If the system is utilizing two factor authentication, i.e., the user name and password plus the digital ID generated by the hardware key attached to the user's computer, the session manager 52 periodically communicates with the shared object 66 to perform reauthentication which involves polling of the subscriber software 36 to insure that the access key 54 continues to be attached to the user computer.

The server shared object 66 is a binary module which provides function pointers to the web server to perform subscription access system's specific operations. To enable this, the server configuration files need to be changed so that the web server 69 knows which resources are protected by the system. In this way, whenever a subscriber attempts to access a protected source, the server will call upon the subscription access functions which are defined in the shared object 66 and the web server 69 will not process the request for protected content until it receives permission to do so from these functions. The functions in the shared object 66 insures that the subscriber is operating as a valid session. If it is not a valid session, the functions redirect the user to the login process so that a new session can be created for the subscriber. Once there is an active session, the shared object 66 will grant permission to the web server 69 to process requests for protected content and once the request has been processed, the shared object sends a message to the session manager 52 about a particular transaction so that the session manager can update its lists of transactions for the active session.

There are a number of subscription access common gateway interface programs (CGI'S) that are a part of the subscription access server 34, including a login CGI 68. Any time a subscriber is redirected by the system shared object 66 to login and start a new session, the login CGI 68 gets executed. These CGI's communicate with the subscriber software 36 to authenticate the subscription access server 34 and send a command to force the subscriber to login. When the CGI's get the login parameters sent by the subscriber software 36, they send a request to the session manager 52 to authenticate the subscriber and start a new session. There is also a reauthentication CGI 70 which is provided. Once a session has been initiated, periodically the shared object 66 will redirect the subscriber to get reauthenticated. The reauthentication CGI 70 communicates with the subscriber software 36 to poll the subscriber's machine for the access key 54 and based upon the response, the reauthentication CGI's communicates with the session manager 52 to validate reauthentication and renew the subscriber session.

The server 34 also includes URL tracking CGI's 72 which carry out the task of recording all the URLs visited by a subscriber. First, the URL tracking CGI's 72 send a message to the subscriber software 36 to perform an URL tracking in response to which the subscriber software collects the URL tracking data from the subscriber's computer and sends it to the URL tracking CGI's. These CGI's then send all the URL tracking data to the URL tracking daemon 62 in the clearinghouse. The subscription access server 34 also includes online subscription application and activation CGI's 74 which allow a person to apply online for a particular subscription protected by subscription access system. The CGI's 74 collect the application data and send it to the clearinghouse 30 which updates the subscription access database. Also, for an existing subscriber who is trying to apply for a different subscription, the CGI's 74 will communicate with the clearinghouse 30 to get the demographic data on the subscriber in order to fill out as much of the application automatically as it can. The activation feature is for applicants who have been approved and are trying to access their subscription for the first time. The CGI's 74 for activation insure that the subscriber has properly installed the subscriber software and then these CGI's will send a message to the clearinghouse 30 to activate their subscription so that these approved applicants can access the new service. The site administration CGI 76 is the component which provides an HTML visual interface to define the subscription profile and administer the session manager 52 for that particular subscription profile.

The subscriber software 36 is installed on the subscriber's personal computer and the software enables the web browser to access the contents protected by subscription access. The subscriber software 36 may be a plug-in for Netscape Navigator Version 3.0 or above or an ActiveX Control for Microsoft Internet Explorer Version 3.1 or above. The subscriber software 36 accepts messages from the web server 69 and takes actions as commanded by the server such as making the subscriber login, polling for the optional access key, encrypting the login parameters and sending it to the server, performing URL tracking, and enforcing copyright protection. The subscriber software 36 also authenticates the server 34 before accepting any commands from it so that only authenticate servers can command the subscriber software.

Figure 5:
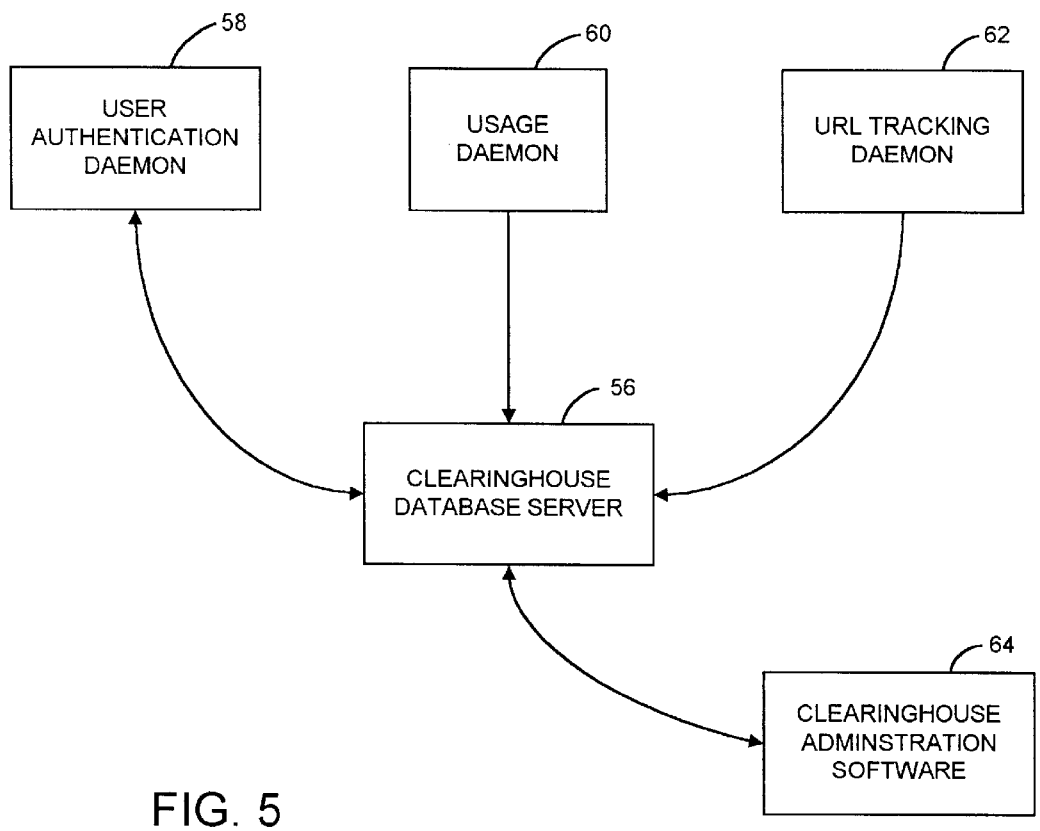
FIG. 5 is a functional block diagram illustrating the structure and operation of the clearinghouse database server process of the preferred embodiment.

Referring to FIG. 5, the main function of the subscription access clearinghouse database server 56 is to provide the database interface to the rest of the subscription access components. It hosts the enterprise-wide subscription database, and the usage and demographics data warehouse. This database server 56 is a SQL server which has an ODBC interface so that the clients can interact with it using ODBC. The subscription access components that interact directly with the subscription access clearinghouse database server 56 are the user authentication daemon 58, usage daemon 60, URL tracking daemon 62, and the clearinghouse administration software 64.

Figure 6:
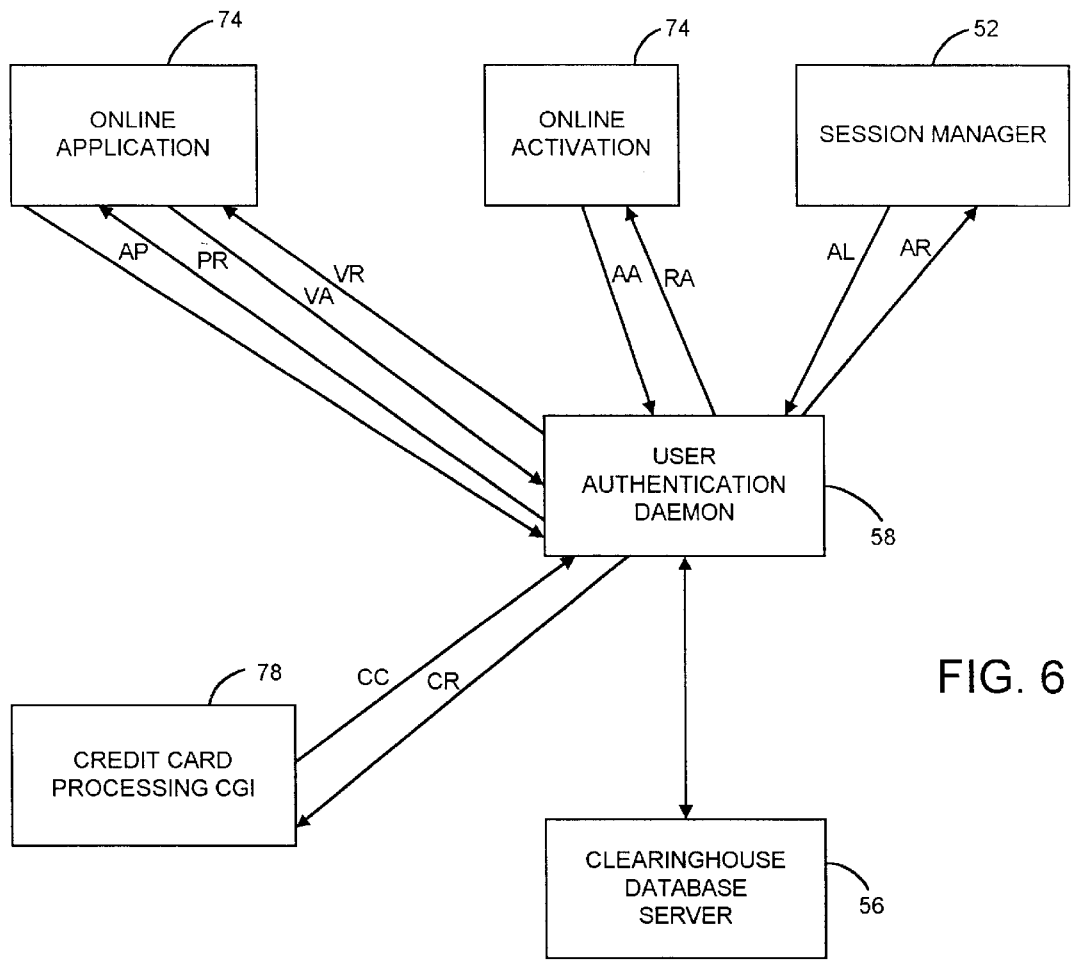
FIG. 6 is a functional block illustrating the structure and operation of the clearinghouse user authentication daemon of the preferred embodiment.

Referring to FIG. 6, the user authentication daemon 58 interacts with the subscription access clearinghouse database server 56, the subscription access server 34, the session manager 52, the subscription access server online application and activation CGI's 74, and any subscription access protected CGI's that use the API's provided by the subscription access system such as credit card processing CGI's 78. In order to start a new session for a subscriber, the session manager 52 sends an authenticate login (AL) message to the user authentication daemon 58, which queries the subscription access clearinghouse database server 56 to find the appropriate subscriber and subscription records in order to do the login validation. The result of this validation is sent back to the session manager 52 as an authentication response (AR) message.

The online application CGI's 74 interact with the user authentication daemon 58 to process an online subscription application. Normally, applicants fill out an online application form and submit it to one of the online application CGI's 74 which will send all the application data in the form of an application (AP) message to the user authentication daemon 58. The daemon 58 will verify and update the database with the application information and send back an application response (PR) message to the application CGI's 74 indicating the status of the database update.

In cases where an existing subscriber is applying for a different subscription, the application CGI's 74 communicate with the user authentication daemon 58 to get the demographic information on the subscriber so that the demographic part of the application form can be filled automatically. In order to do this, one of the application CGI's 74 sends a verify application (VA) message to the user authentication daemon 58. The daemon 58 will query the subscription access clearinghouse database server 64 to verify the applicant and get the demographic information. Based on the query results, it will send a verification response (VR) back to the application CGI 74 which will contain the demographic information. The application CGI 74 will fill out the demographic part of the application form with this information. The subscriber fills out the rest and submits the form which gets processed through the AP/PR message mentioned previously.

Once an applicant has been approved, the applicant needs to activate his/her subscription in order to access protected contents. This can be done online through the online activation CGI's 74. Typically, an approved applicant will have to login in order to access the online activation CGI 74, which in turn sends an AA (Activate Applicant) message to the user authentication daemon 58 with the approved applicant's login parameters. The daemon 58 will query the clearinghouse database server 64 to validate this information, and based on the validation results, it will send back an activation response (AR) message to the online activation CGI.

For web applications that need credit card information on subscribers, the user authentication daemon 58 provides an application programming interface (API) to do so. This also assumes that the subscriber has logged in successfully and has an active session, which means these web applications need to be protected by subscription access. In order to obtain the credit card information, these web applications can send a CC (credit card) message to the user authentication daemon 58. The daemon 58 will first validate the subscriber and their subscription, and if the validation is successful, it will send back a credit response (CR) to the credit card processing web application 78 which includes the subscriber's credit card information.

Referring to FIG. 7, the main task of the usage daemon 60 is to update the subscription access database with usage data sent by the subscription access server session manager 52. The usage daemon 60 is an independent process listening for TCP requests on a specific, well-known TCP port. When a subscriber session terminates, the session manager 52 will send a usage session (US) message to the usage daemon 60 which provides some generic information about the subscriber's session and also the number of transactions in the session. This message is followed by a series of session transaction (ST) messages, where each transaction in that session is represented by a ST message. The usage daemon 60 reads the US message and the following ST message(s), formulates SQL queries that will update all that data into the subscription access clearinghouse database 56. The usage daemon 60 will then send back a message confirmation (MC) back to the session manager 52 which indicates the status of the database update.

As shown in FIG. 8, the URL tracking daemon 72 is also an independent server process listening for messages on a well known TCP port. The only subscription access entity that communicates with it is the URL tracking CGI 72. During the URL tracking process, the subscription access subscriber software 36 sends URL tracking data to the URL tracking CGI 72 which then sends a URL data (UD) message followed by multiple UT (URL track) messages to the URL tracking daemon 62. The UD message is a header message which indicates how many UT messages will follow. Each UT message represents one particular URL data tracked from the subscriber's machine.

The URL tracking daemon 62 first authenticates the URL tracking CGI 72 to ensure it is a part of an authentic subscription access server 34. It then accepts the UD and UT messages and formulates SQL queries to submit them to the clearinghouse database server 56 for database update.

As shown in FIG. 9, the clearinghouse administration software 64 is a GUI client/server application for clearinghouse database administration. This software runs on Windows95® machines and communicates with the clearinghouse database server through an ODBC driver 80. This application will typically be on the private network of an organization so that database access through the administration software 64 is restricted within the organization. The administration software 64 allows an administrator to define the particular subscription services and administer their subscribers. It allows entering applicants for a subscription, approving and activating them, and maintaining their subscription profiles. It also provides inquiry screens to peruse usage data and URL tracking data. Also provided are table maintenance screens for the code tables in the database.

As shown in FIG. 10, the subscription access shared object 66 is a binary module that combines with the web server 69 to provide system-specific function pointers to the web server. Thus, when the web server 69 is configured to protect contents using the system, it will call upon these system specific functions. These functions provide a variety of features ranging from redirecting a subscriber to the login CGI's 68 to communicating with the session manager 52 to authenticate every request for protected contents. Whenever there is an incoming request from a web browser that attempts to access a system-protected content, the web server invokes the subscription access shared object 66. The subscription access shared object 66 calls a subscription access system function who first looks for an active session ID in the HTTP headers. If it does not find the session ID, it will redirect the user to the login CGI's 65 in order to initiate the login process. If it finds a session ID, it sends a check session (CS) message to the session manager 52 to validate the session ID. The session manager 52 will send the results of its validation in a session response (SR) message.

If the SR message has a SUCCESS status, the shared object 66 grants permission to the web server 69 to process the request for the subscription access protected content. At the end of processing this request, the shared object 66 calls another subscription access system function which sends an end transaction (ET) message to the session manager so that the session manager 52 can log the end time for the specific web transaction. Periodically, the SR message will ask the shared object 66 to perform session reauthentication. At such times, the shared object 66 redirects the suer to reauthentication CGI's 70.

With the system architecture, contents are protected on a directory level. A web master or a system administrator needs to determine which contents are to be protected and make sure that all these contents are organized in separate directories from unprotected contents. In this way, the web server configuration can be changed to protect these particular directories using the subscription access system. Among other things, the configuration parameters also need to state where the session manager 52 is running and the port where it is listening for UDP requests. If there are multiple subscriptions being hosted from the same web servers 69, it is very important to have their contents in separate directories, and also very important is to have separate copies of session managers 52 running for each subscription. This ensures that user authentication, authorization, and usage tracking is done separately for separate subscriptions.

Figure 11:
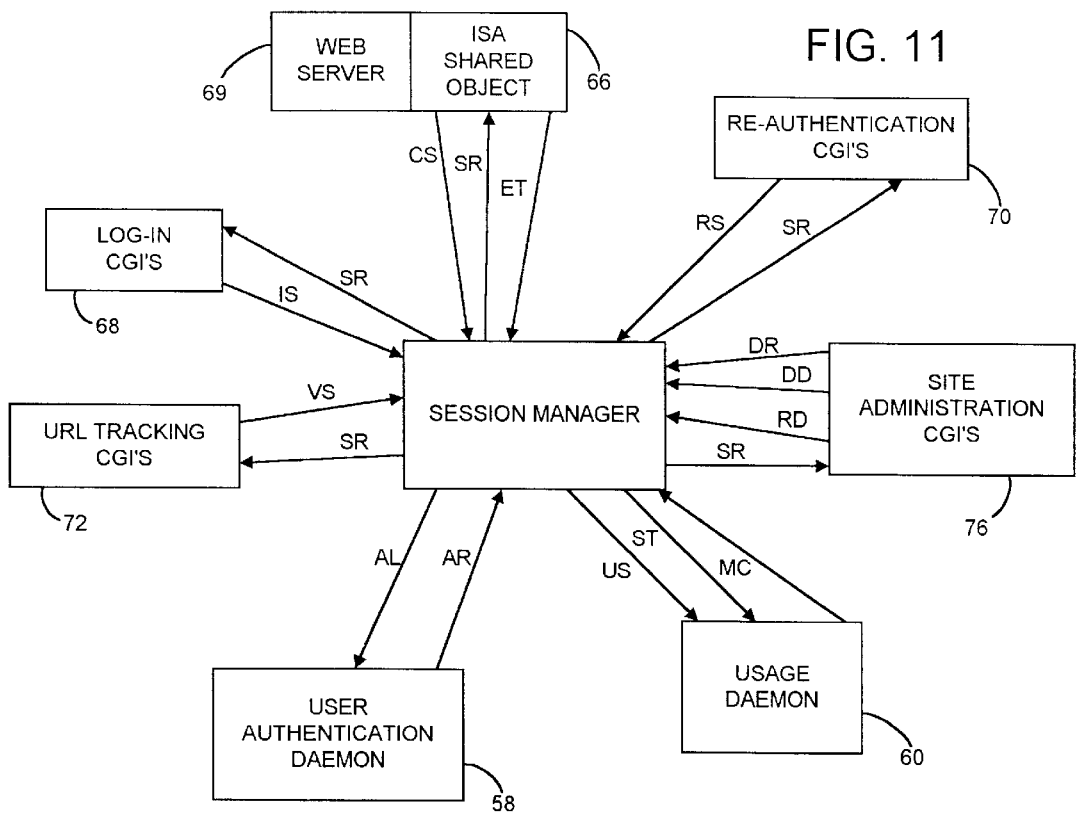
FIG. 11 is a functional block diagram illustrating the structure and operation of the server session manager of the preferred embodiment.

The subscription access server session manager 52 shown in FIG. 11 is an independent server process. It starts by reading configuration parameters from its configuration file, sessiond.conf. It listens for requests on two different ports— one UDP, and one TCP. The UDP port communications with the subscription access shared object 66 and the subscription access CGI's which reside on the same machine where the session manager 52 is running. The TCP port is for communication with the subscription access clearinghouse daemons.

The session manager 52 maintains a binary tree list of all the active subscriber sessions. For every session, it maintains a linked list of all the transactions for that session. As stated in the description of the shared object 66, every time a web request comes in for an system protected content, the web server 69 will invoke the shared object 66. The shared object 66 looks at the web server configuration files to determine which session manager 52 (hostname and UDP port number) to send its check session (CS) message. In processing a CS message, the session manager 52 will traverse its list of active sessions looking for the particular session ID, and sends the result of this search back in a session response (SR) message.

During login, the login CGI's 68 send an initiate session (IS) message to the session manager 52, which will read the login parameters, and send an authenticate login (AL) message to the subscription access clearinghouse user authentication daemon 58. It will read the user authentication daemon's 58 authentication response (AR) and determine whether or not to create a new session entry, and sends a session response (SR) back to the login CGI's 68 indicating the result of the session initiation process.

While processing a CS message sent by the shared object 66, periodically the session manager 52 will find that a particular session needs to be reauthenticated. In such instances, the session manger 52 will respond back to the shared object 66 with a session response (SR) message that tells the shared object to initiate the reauthentication process. The shared object 66 in turn invokes the reauthentication CGI's 70. The reauthentication CGI's 70 perform the reauthentication task with the subscription access subscriber software 36, and sends the results in a renew session (RS) message to the session manager 52. The RS message contains the newly encrypted digital ID read off the optional access key 54 from the subscriber's machine. The session manger 52 authenticates the digital ID by comparing it to the information it has in the session entry for the particular subscriber. The results of this authentication is sent back to the reauthentication CGI 70 in a session response (SR) message.

During specific time intervals as set in the session manger 52 configuration, the session manager 52 goes through its list of sessions and times out idle sessions, flagging them as inactive. These are sessions which have not had an activity in the last n seconds, where n is a session manager configuration (REFRESH_TIME) value. For each one of these inactive sessions, the session manger 52 spawns a child process that will send all the usage data collected for that session to the subscription access clearinghouse's usage daemon 60. The child process first reads the session-entry and sends a usage session (US) message that will tell the usage daemon 60 how many transaction entries will be sent for that session. The US message is followed by a series of session transaction (ST) messages where each ST message represents a transaction for that session. The child process terminates after sending all the US and ST messages. The usage daemon 60 will update the subscription access clearinghouse database with all the usage data, and sends a message confirmation (MC) message back to the session manager 52. The session manager 52 determines which specific session the MC message is for, and deletes that session and its transactions from its list. If the MC message status is not successful, the session manager 52 tries to resend the usage data. The number of retries is set in the session manager 52 configuration. If it is still unsuccessful, then the session manger 52 sends an e-mail to the system administrator indicating the error in usage data update.

During the URL track process, the URL tracking CGI's 72 need to verify that the URL data is coming from a subscriber with a valid active session. The URL tracking CGI's 72 send a verify session (VS) message to the session manager 52. The session manager 52 goes through its list of active sessions, very much like processing for CS messages, and sends the result of the validation in its SR message to the URL tracking CGI 72. Another subscription access entity the session manager 52 performs processing for is the site administration CGI's 76. The specific operations provided are data recovery, data dump, and data restore features. During data recovery, the site administration CGI's 76 send a DR (data recovery) message to the session manager 52. The session manager 52 will retry sending the usage data for the session(s) specified in the DR message to the subscription access clearinghouse's usage daemon 60.

During a data dump, the site administration CGI 76 sends a data dump (DD) message to the session manager 52 who makes a copy of all the active session data into a flat text file under the filename specified in the DD message. During a restore dump, the site administration CGI 76 sends a restore dump (RD) message to the session manager 52 who reads the dump file as named in the RD message and builds its list of sessions and transactions from the dump file data. To all these messages (DR, DD, RD), the session manager 52 sends a SR message back to the site administration CGI's 76 indicating the results of the particular operations whether they were successful or not.

Figure 12:
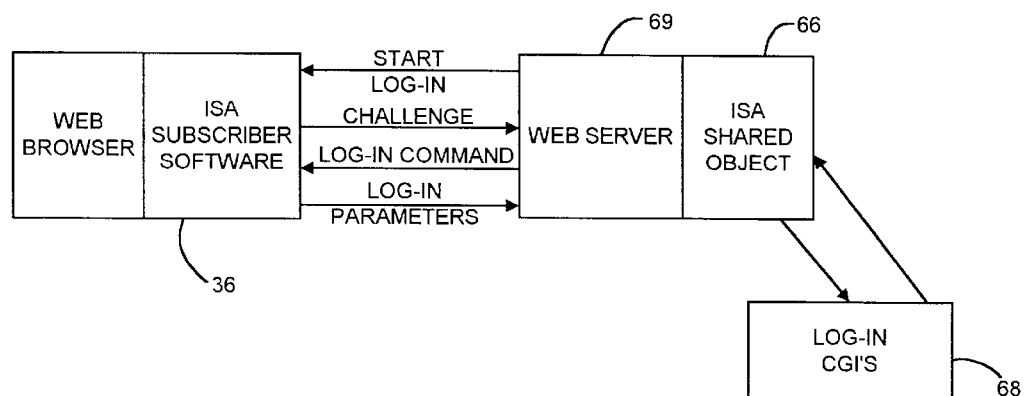
FIG. 12 is a functional block diagram illustrating the structure and operation of the server login common gateway interface (CGI) program of the preferred embodiment.

Referring to FIG. 12, the login CGI's 68 get invoked when the subscription access shared object 66 redirects a user to login. It first sends a start login message to the subscription access subscriber software 36 through the web server 69. The subscription access subscriber software 36 then creates a random challenge and sends it to the login CGI's 68 for subscription access server authentication purposes. The login CGI's 68 encrypts the subscription access server's password using the challenge sent by the subscription access subscriber software 36 and sends it back to the subscription access subscriber software along with a login command and a new random challenge created by the login CGI 68. The subscription access subscriber software 36 then authenticates the subscription access server's password, and if it authenticates successfully, it will force the user to login. The login parameters obtained from the user and the access key 54 are encrypted using the challenge sent by the login CGI 68, and sent back to the login CGI 68.

The login CGI's 68 take the encrypted login parameters sent by the subscription access subscriber software 36 and send an initiate session (IS) message to the session manager 52. The session manager 52 conducts the subscriber verification with the aid of the subscription access clearinghouse 30 and sends back a session response (SR) indicating if a new session entry was created. If SR status is successful, the login CGI 68 will put the session ID in the HTTP headers for reauthentication purposes.

Figure 13:
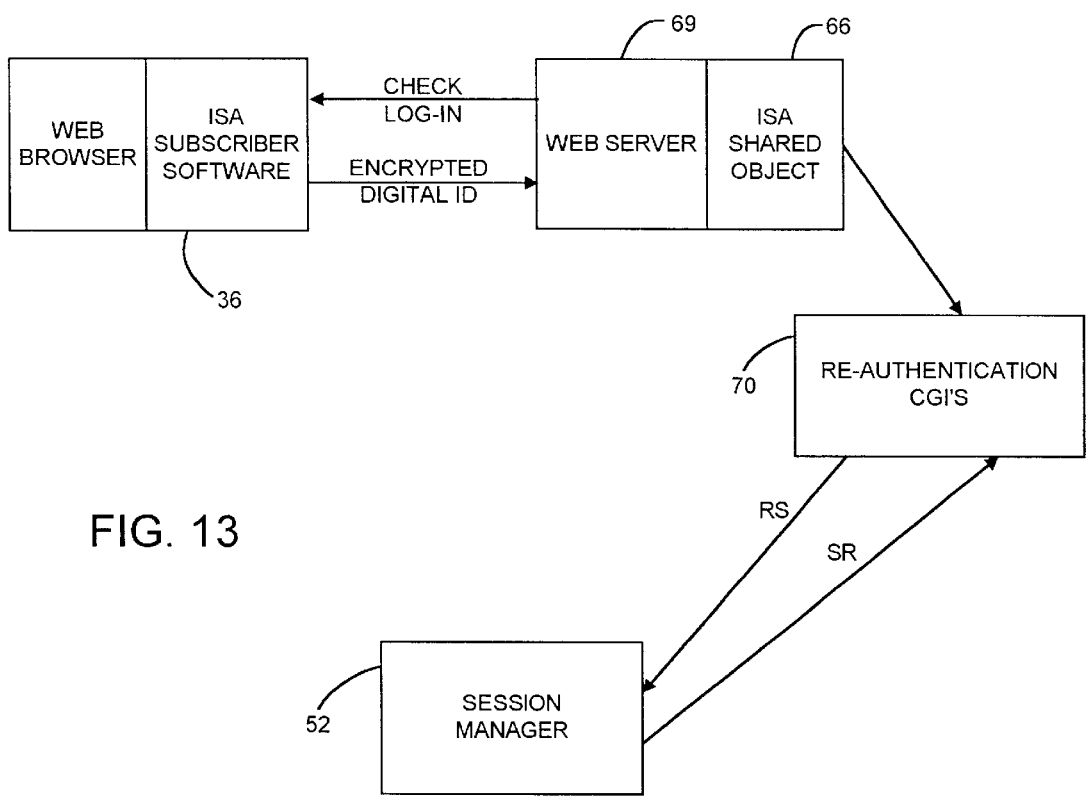
FIG. 13 is a functional block diagram illustrating the structure and operation of the server reauthentication common gateway interface (CGI) program of the preferred embodiment.

As shown in FIG. 13, the reauthentication CGI's 70 are invoked by the subscription access shared object 66. They send a check login message to the subscription access subscriber software 36 with a newly created challenge. In response to this message, the subscription access subscriber software 36 polls the access key 54, reads its digital ID, and encrypts it using the challenge sent by the reauthentication CGI's 70. This is sent back to the reauthentication CGI 70 who will validate the information by sending a renew session (RS) message to the session manager 52. The session manager 52 validates the encrypted digital ID and sends back a session response (SR) message indicating the status of the reauthentication. If SR status is successful, the reauthentication CGI 70 redirect the subscriber to the protected resource, otherwise they are directed to the login process.

Figure 14:
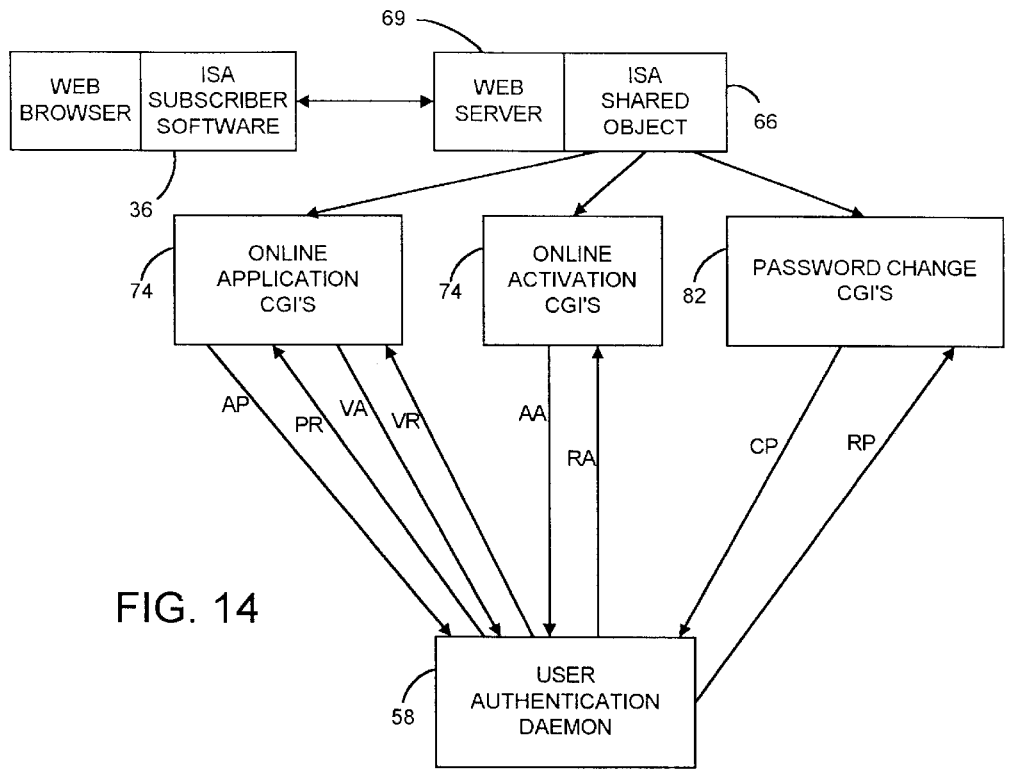
FIG. 14 is a functional block diagram illustrating the structure and operation of the server online application and activation common gateway interface (CGI) program of the preferred embodiment.

Referring to FIG. 14, the online application process is initiated by a new applicant filling out an HTML application form and submitting it to the application CGI 74. If the applicant is an existing subscriber, he/she can go through a separate link which will automatically fill out the demographic part of the application form. When an existing subscriber goes through this link, they are made to login. The particular application CGI 74 will then send a verify application (VA) message to the user authentication daemon 58. The daemon will first authenticate the subscriber, and if the authentication is successful, it will send back the demographic information on the subscriber in its verification response (VR) message. The application CGI 74 will fill out the HTML application form with the information in the VR message. For someone who is not an existing subscriber, they will of course have to go to the application form directly and fill out all the fields manually and submit the form.

When the application form is submitted, the application data is sent to another application CGI 74 who will send an application (AP) message to the user authentication daemon 38. The daemon 38 will verify all the application data and update the clearinghouse database. The result of the database update is sent back to the application CGI 74 in an application response (PR) message. The application CGI 74 will then display the result of this process to the applicant.

The application approval process can be conducted in a variety of ways. For subscriptions offering one-factor authentication only, where access keys 54 are not used, an applicant can be instantly approved during the time of application, in which case the PR message contains the username and password assigned to the applicant. This information is displayed back to the applicant immediately so that they can proceed with the subscription activation process right away. The other method is not to approve the application immediately. Instead a system administrator individual will do some additional processing of the application data to ensure that the applicant meets all the prerequisites of being a subscriber. This could involve things like collecting payment, demographic checks, etc. Once the requirements are met, the system administrator will approve the applicant using the subscription access clearinghouse administration software 64.

The result of the application approval process is that the applicant will now be assigned a unique username and a password. If the subscription uses two-factor authentication, the approval process also involves assigning a unique digital ID to the applicant, and microcoding that digital ID inside an access key 54. All this information (username, password, digital ID), the applicant's access key 54, and the subscription access subscriber software 36 needs to be made available to the approved applicant so that they can successfully install the subscription access subscriber software 36 on their desktop, and proceed with the activation process.

Completion of the activation process is actually when an applicant becomes a full-fledged subscriber for a particular subscription. Just like the application process, this can be done through either online or through the subscription access subscriber administration software 32. Online activation requires an approved applicant to install the subscription access subscriber software on their desktop and visit the activation URL using their web browser. When they hit the activation URL, it will make them login. At this point, the approved applicant will use the username, password, and the access key if using two-factor authentication, to login. The activation CGI takes all this information and sends an approve applicant (AA) message to the subscription access clearinghouse's user authentication daemon 58. This daemon 58 will accept the AA message, and verify all the information with the approved applicant's information in the clearinghouse database. If the verification is successful, the user authentication daemon 58 will create a new subscriber record for the applicant if there is not already one, and also create a new subscription record for the particular subscription for which the applicant got approved. If the result of this process is sent back to the activation CGI 74 in an activation response (RA) message. If RA message status is successful, the activation CGI 74 will display a successful activation message to the user, and give them an option to change password if they want to. Otherwise, it will display the error message explaining why application activation could not be conducted successfully.

A feature of the online application and activation process is the password change feature which can be made available as a separate link in a subscription access protected web site. This link must be protected by the system so that only valid subscription access subscribers can use this feature. When this link is accessed, a password change form is displayed to the subscription access subscriber where they type in the old and new passwords. Once this form is submitted, a password change CGI 82 will send a change password (CP) message to the user authentication daemon 58 in the subscription access clearinghouse who will verify the subscription access subscriber and the old password. If the verification is successful, the user authentication daemon 58 will make the password change in the clearinghouse database. The status of this process is sent back to the password change CGI 82 in a password response (RP) response. Based on the RP message status, the password change CGI will display a message to the subscription access subscriber indicating whether the password change was carried out successfully.

Figure 15:
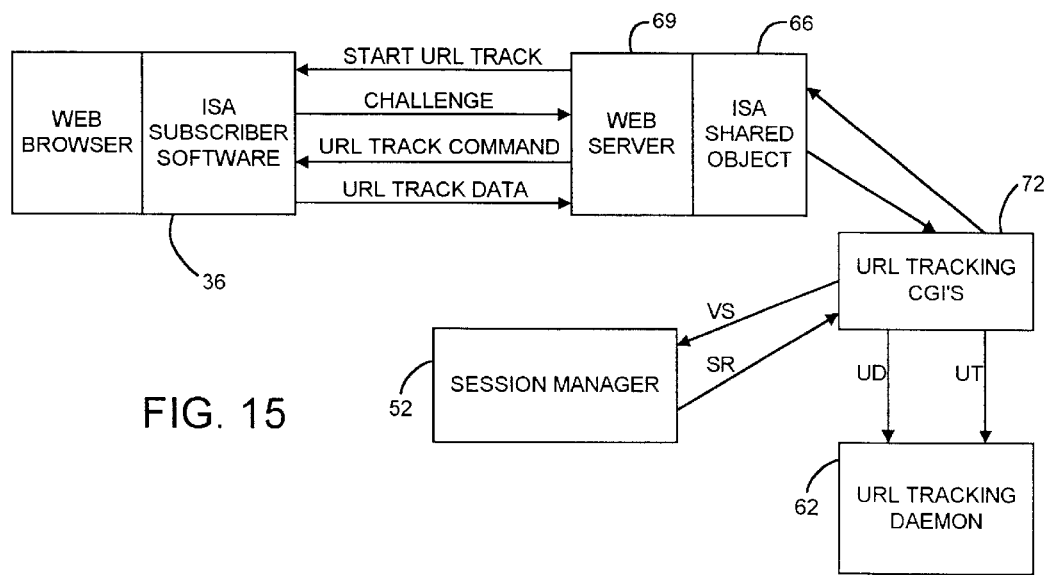
FIG. 15 is a functional block diagram illustrating the structure and operation of the server URL tracking common gateway interface program of the preferred embodiment.

As shown in FIG. 15, the URL tracking CGI's 72 are either initiated by the login process or they can be initiated directly at any time by the subscription access server 34. Once they are in effect, they send a start URL tracking message to the subscription access subscriber software 36 which will respond with a newly generated random challenge. At this point, the URL tracking CGI's 72 will encrypt the subscription access server password with the challenge sent by the subscription access subscriber software 36 and send a URL tracking command back to the subscription access subscriber software 36 along with it. The subscription access subscriber software 36 will first authenticate the subscription access server's password, and if this authentication is successful, it will collect URL data from the subscription access subscriber's machine and sent all the URL data to the URL tracking CGI's 72. These CGI'S will accept all the URL data and send them to the URL tracking daemon 62 in the subscription access clearinghouse 30 using URL data (UD) and URL track (UT) message. A UD message is a header message that tells the URL tracking daemon 62 how many UT messages are going to follow the UD message. Each UT message represents a particular URL collected from the subscriber's machine.

Figure 16:
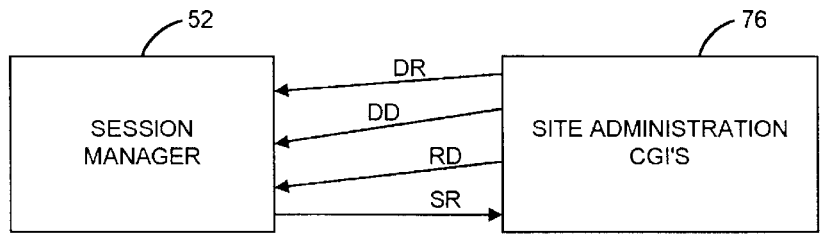
FIG. 16 is a functional block diagram illustrating the structure and operation of the server site administration common gateway interface program of the preferred embodiment.

As shown in FIG. 16, the site administration CGI's 76 allow defining subscription profiles and maintaining session manager configuration entries through an HTML interface. It also allows starting, stopping, and restarting session manager(s) 52. The specific operations provided by the site administration CGI's 76 that involve message interaction with the session manager 52 are the data recovery, data dump, and the data restore features. During a data recovery, the site administration CGI's 76 send a DR (data recovery) message to the session manager 52. The session manager will retry sending the usage data for the session(s) specified in the DR message to the clearinghouse's usage daemon 60.

During data dump, the site administration CGI 76 sends a data dump (DD) message to the session manager 52 which makes a copy of all the active session data into a flat textfile under the filename specified in the DD message. During restore dump, the site administration CGI 76 sends a restore dump (RD) message to the session manager 52 which reads the dump file as named in the RD message and builds its list of sessions and transactions from the dump file data. To all these messages (DR, DD, RD), the session manager 52 sends a SR message back to the site administration CGI's 76 indicating the results of the particular operations whether they were successful or not.

The specific operations of the system will now be described in connection with the flow charts of FIGS. 17–23. In order to distinguish the present invention from the preferred embodiment in the web environment, the flowcharts use different terminology for the system components. FIGS. 4–16 describe the software components of the preferred embodiment. The following table illustrates how the different terminology match up with each other.

| Flowchart components | Preferred Embodiment onto Web Environment |
| --- | --- |
| Client Application | Web browser |
| Client Messenger | a module of subscriber software |
| Server Authenticator | a module of subscriber software |
| Log-in interface | a module of subscriber software |
| Access Key interface | a module of subscriber software |
| Client Cryptographer | a module of subscriber software |
| Content Controller | a module of subscriber software |
| Network usage tracker | a module of subscriber software |
| Server Application | Web Server |
| Communication Headers | HTTP headers |
| Client Authenticator | a module of Shared Object for Web Server |
| Transaction Monitor | a module of Shared object for Web Server |
| Log-in Enforcer | Log-in CGI's |
| Access Key Validator | Re-authentication CGI's |
| Network Usage Tracking Collector | URL tracking CGI's |
| Session Validator | a module of Session Manager |
| Session Initiator | a module of Session Manager |
| Session Terminator | a module of Session Manager |
| Authentication Server | Clearinghouse User authentication daemon |
| Usage Data Server | Clearinghouse Usage daemon |
| Network Usage Tracking Server | URL Tracking Server |

Figure 17:
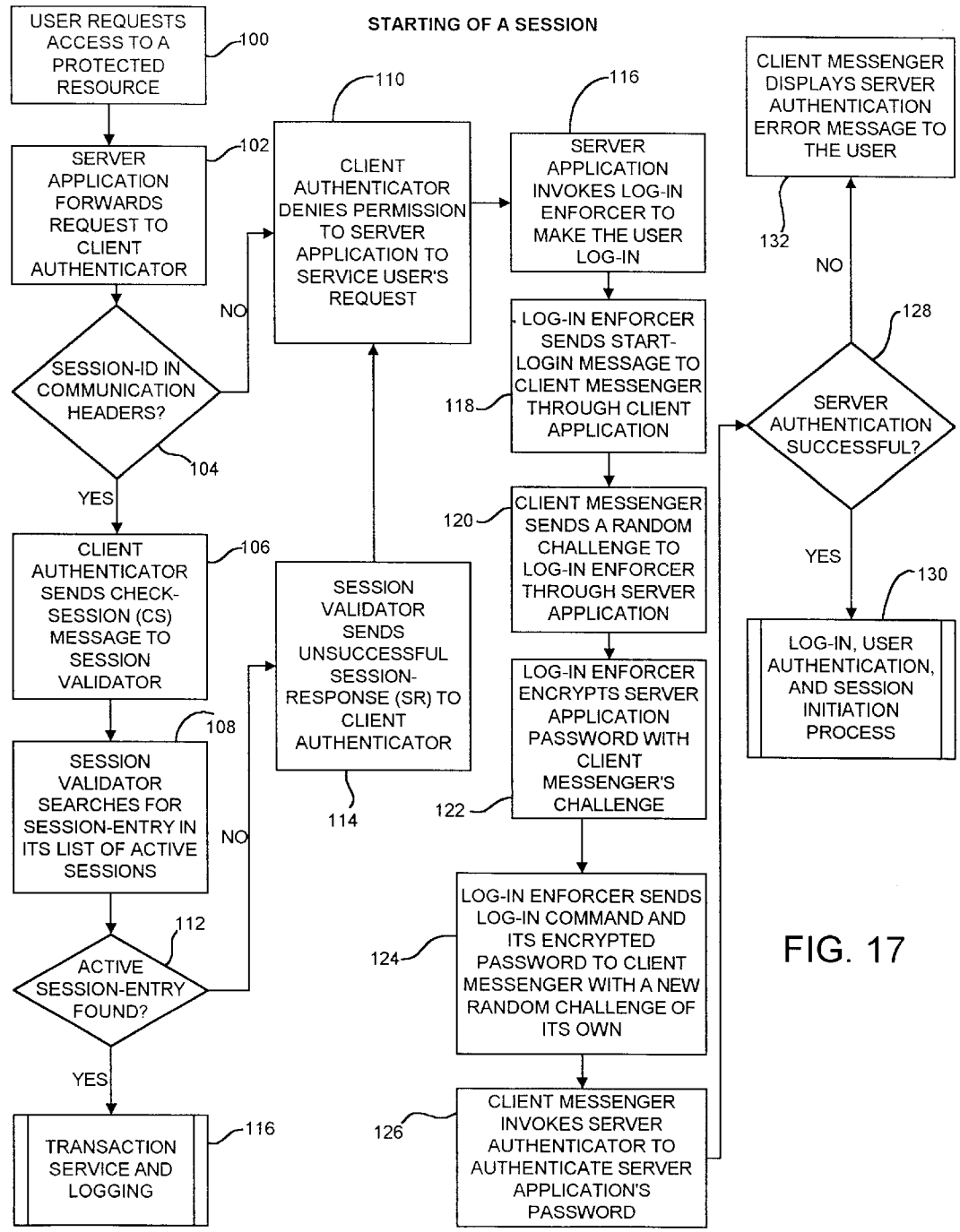
FIG. 17 is a flow chart of the operation of the system at the start of a session where a user requests access to a protected resource.

Referring to FIG. 17, the flow chart illustrating the sequence of steps that occur during the start of a session is illustrated and begins with the user requesting access to a protected resource (block 100). The server application forwards the request to the client authenticator (block 102). If the session ID is in the communication headers (block 104), the client authenticator sends a check session message to the session validator (block 106) and the session validator searches for session entry in its list of active sessions (block 108). If the session ID is not in the communication headers, the client authenticator denies permission to server application to service the user's request (block 110). Also, if the active session entry is not found (block 112), the session validator sends unsuccessful session response to the client authenticator (block 114). However, if there was an active session entry found, transaction service and logging occurs (block 116) (see FIG. 19). If the client authenticator denies permission to the server application, the server application invokes the login enforcer to make the user login (block 116). This results in a start login message being sent to the client messenger through the client application (block 118). The client messenger sends a random challenge to login an enforcer through the server application (block 120) and the login enforcer then encrypts the server application password with a client messenger challenger (block 122). The login enforcer then sends a login command in its encrypted password to the client messenger with a new random challenge of its own (block 124) and the client messenger then invokes server authenticator to authenticate server applications password (block 126). If the server authentication is successful (block 128), the login, user authentication and session initiation process occurs (block 130) (see FIG. 18). If not, the client messenger displays server authentication error message to the user (block 132).

Figure 18:
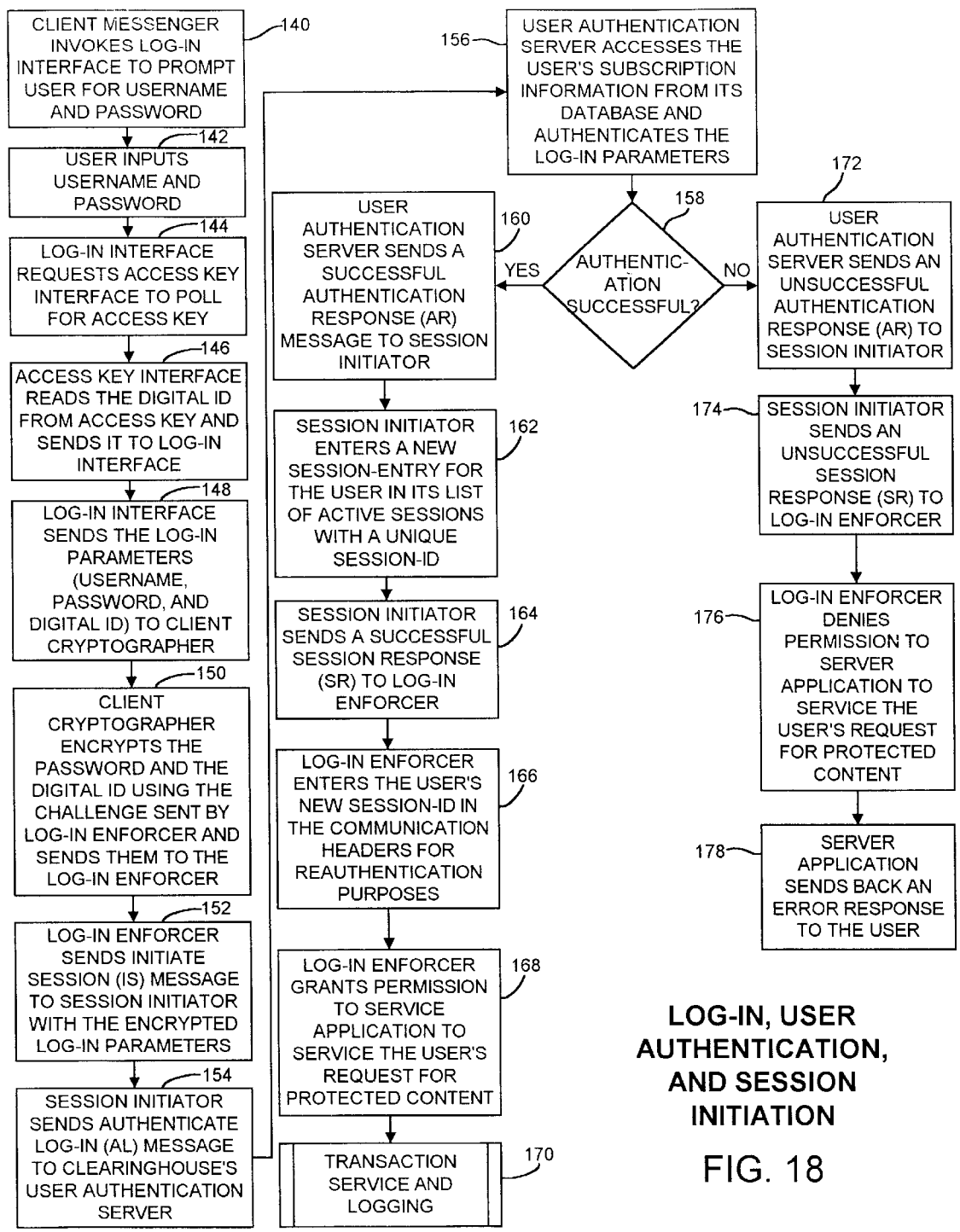
FIG. 18 is a flow chart of the system illustrating the steps that are taken during the login, user authentication and session initiation.

The login, user authentication, and session initiation flow chart shown in FIG. 18 then proceeds as a result of block 130 occurring. Thus, the client messenger invokes a login interface to prompt user for its user name and password (block 140). The user then inputs the user name and password (block 142) and the login interface requests the access key interface to poll for the access key (block 144). If using two-factor authentication, the access key interface reads the digital ID from the access key and sends it to the login interface (block 146). In the case of one-factor authentication, the login interface assigns a blank digital ID for the login parameters. The login interface then sends the login parameters, including the user name, password and digital ID to the client cryptographer (block 148). The client cryptographer encrypts the password and the digital ID using the challenge sent by the login enforcer and sends them to the login enforcer (block 150). The login enforcer then sends an initiate session message to the session initiator with the encrypted login parameters (block 152). The session initiator then sends an authenticate login message to the clearinghouse user authentication server (block 154) and the user authentication server accesses the user's subscription information from its database and authenticates the login parameters (block 156). If using a two-factor authentication, this authentication involves the comparison of digital ID, otherwise only username and password are considered as login parameters. If the authentication was successful (block 158), the user authentication server sends a successful authentication response message to the session initiator (block 160). The session initiator then enters a new session entry for the user and its list of active session with a unique session ID (block 162). The session initiator then sends a successful session response to the login enforcer (block 164) and the login enforcer then enters the user's new session ID in the communication headers for reauthentication purposes (block 166). The login enforcer grants permission to service application to service the user's request for protected content (block 168) and proceeds to transaction service and logging (block 170, see FIG. 19). However, if authentication is unsuccessful (block 158), the user authentication server sends an unsuccessful authentication response to the session initiator (block 172). The session initiator then sends an unsuccessful session response to the login enforcer (block 174). The login enforcer denies permission to the server application to service the user's request for protected content (block 176) and the server application sends back an error response to the user (block 178).

Figure 19:
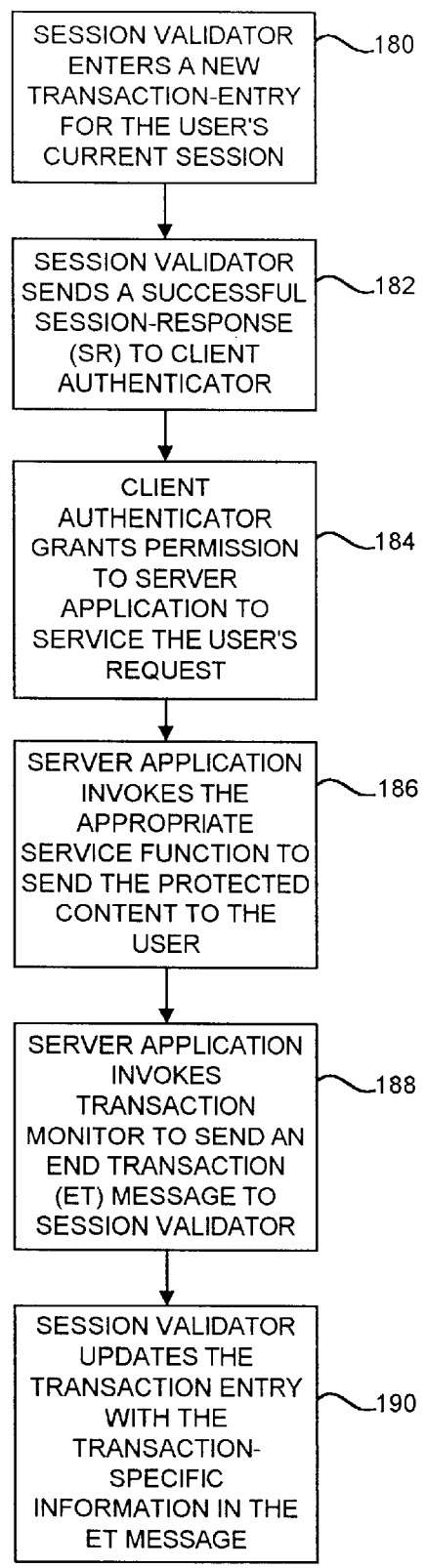
FIG. 19 is a flow chart of the sequence of steps that occur during transaction service and login.
Figure 20:
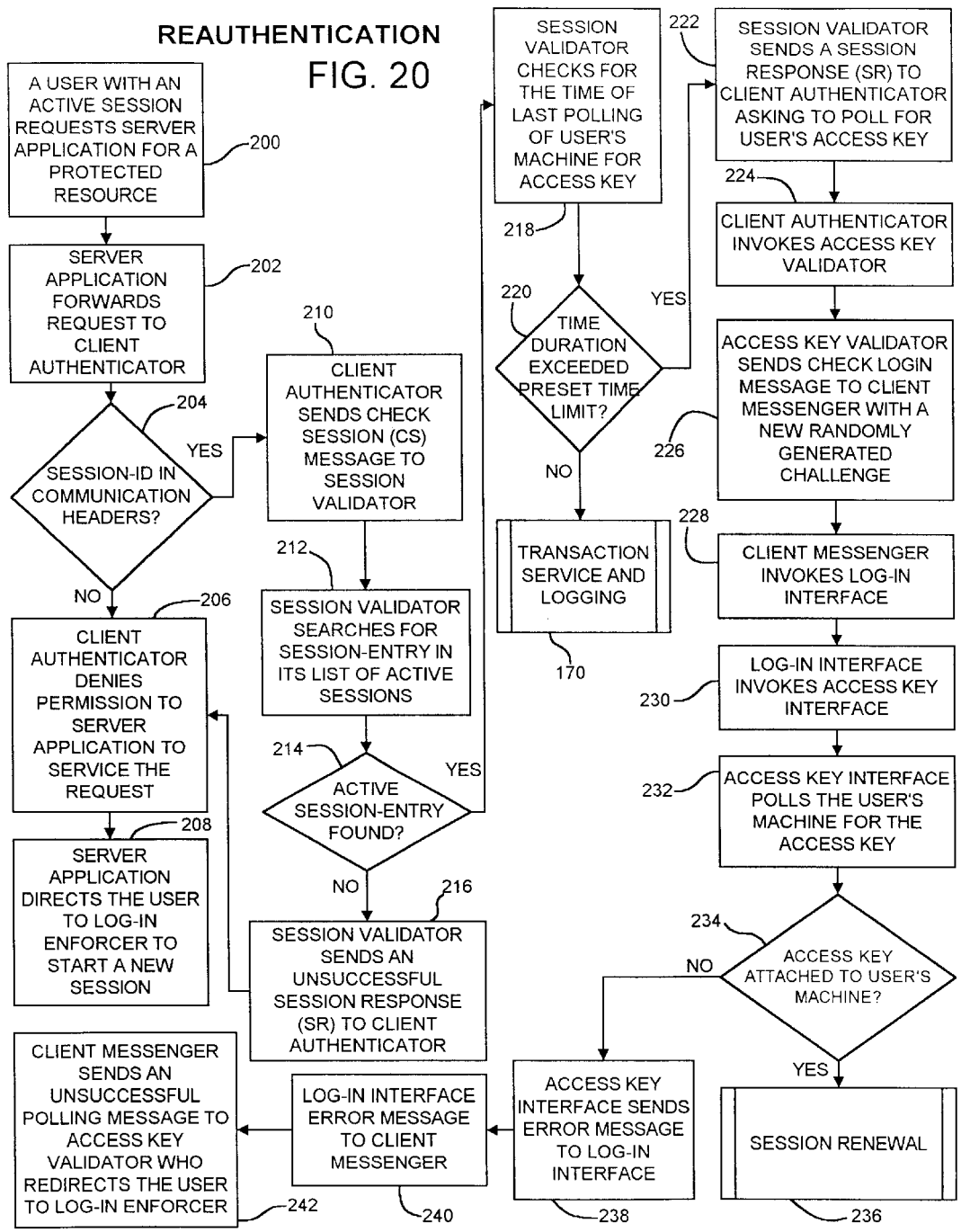
FIG. 20 is a flow chart of the sequence of steps taken during a reauthentication operation.

The transaction service and logging process (block 170) is shown in FIG. 19 wherein the session validator first enters a new transaction entry for the user's current session (block 180). The session validator then sends a successful session response to the client authenticator (block 182) and the client authenticator grants permission to the server application to service the user's request (block 184). The server application invokes the appropriate service function to send the protected content to the user (block 186) and the server application invokes the transaction monitor to send an end transaction message to the session validator (block 188). The session validator updates the transaction entry with the transaction-specific information in the end transaction message (block 190).

In accordance with an important aspect of the present invention and as previously described, the system is adapted to periodically reauthenticate an active session to prevent unauthorized use by someone who no longer has a key 54 connected to his computer. With respect to the reauthentication process, and referring to FIG. 20, the process begins with a user in an active session requesting a protected resource (block 200). The server application forwards the request to the client authenticator (block 202) and communication headers are screened to see if they have a session ID (block 204). If there is no session ID, the client authenticator denies permission to the server application to service the request (block 206) and the server application directs the user to the login enforcer to start a new session (block 208). If the session ID is in the communication header, the client authenticator sends a check session message to the session validator (block 210).

The session validator searches for a session entry in its list of active sessions (block 212) and determines if an activate session entry was found (block 214). If not, the session validator sends an unsuccessful session response to the client authenticator (block 216) and the client authenticator denies permission to service the request (block 206). If an active session is found, then the session validator checks for the time of the last polling of the user's machine to determine if the access key 54 is present (block 218). The time duration is checked to determine if it exceeds the preset time limit (block 220), and if it has not, then the system goes to the transaction service and logging step (block 170) (see FIG. 19). If the time duration has exceeded the preset time limit, the session validator sends a session response to the client authenticator asking to poll for the user's access key (block 222). The client authenticator invokes the access key validator (block 224) and the access key validator then sends the check login message to client messenger with a new randomly generated challenge (block 226). The client messenger invokes the login interface (block 228) and the login interface invokes the access key interface (block 230). The access key interface polls the user's machine for the access key 54 (block 232) and a determination is made whether the access key is attached to the user's machine (block 234). If it is, then the program implements a session renewal (block 236). If it is not attached, the access key interface sends an error message to the login interface (block 238) and the login interface generates an error message to the client messenger (block 240) and the client messenger then sends an unsuccessful polling message to the access key validator which redirects the user to the login enforcer (block 242).

Figure 21:
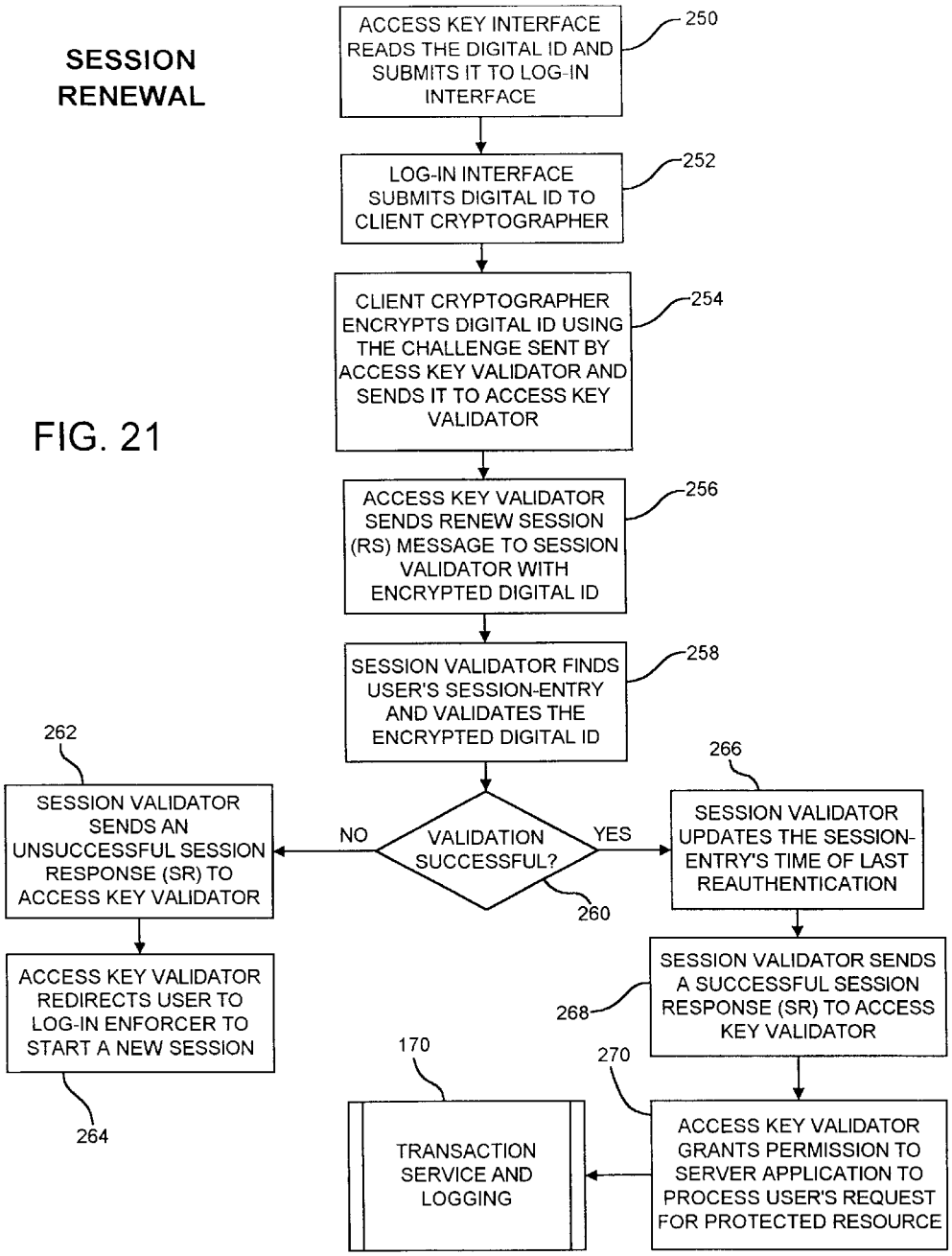
FIG. 21 is a flow chart of the sequence of steps that occur during a session renewal.

With respect to the session renewal and referring to FIG. 21, the access key interface reads the digital ID and submits it to the login interface (block 250) which submits the digital ID to the client cryptographer (block 252). The client cryptographer encrypts the digital ID using the challenge sent by the access key validator and sends it to the access key validator (block 254) which then sends a renew session message to the session validator with the encrypted digital ID (block 256). The session validator finds user session entry and validates the encrypted digital ID (block 258) and determines if the validation was successful (block 260). If not, the session validator sends an unsuccessful session response to the access key validator (block 262) and the access key validator redirects the user to the login enforcer to start a new session (block 264). If validation was successful, the session validator updates the session entry's time of last reauthentication (block 266) and sends a successful session response to the access key validator (block 268). The access key validator grants permission to the server application to process the user's request for protected resource (block 270) and then proceeds to the transaction service and logging step (block 170) (see FIG. 19).

Figure 22:
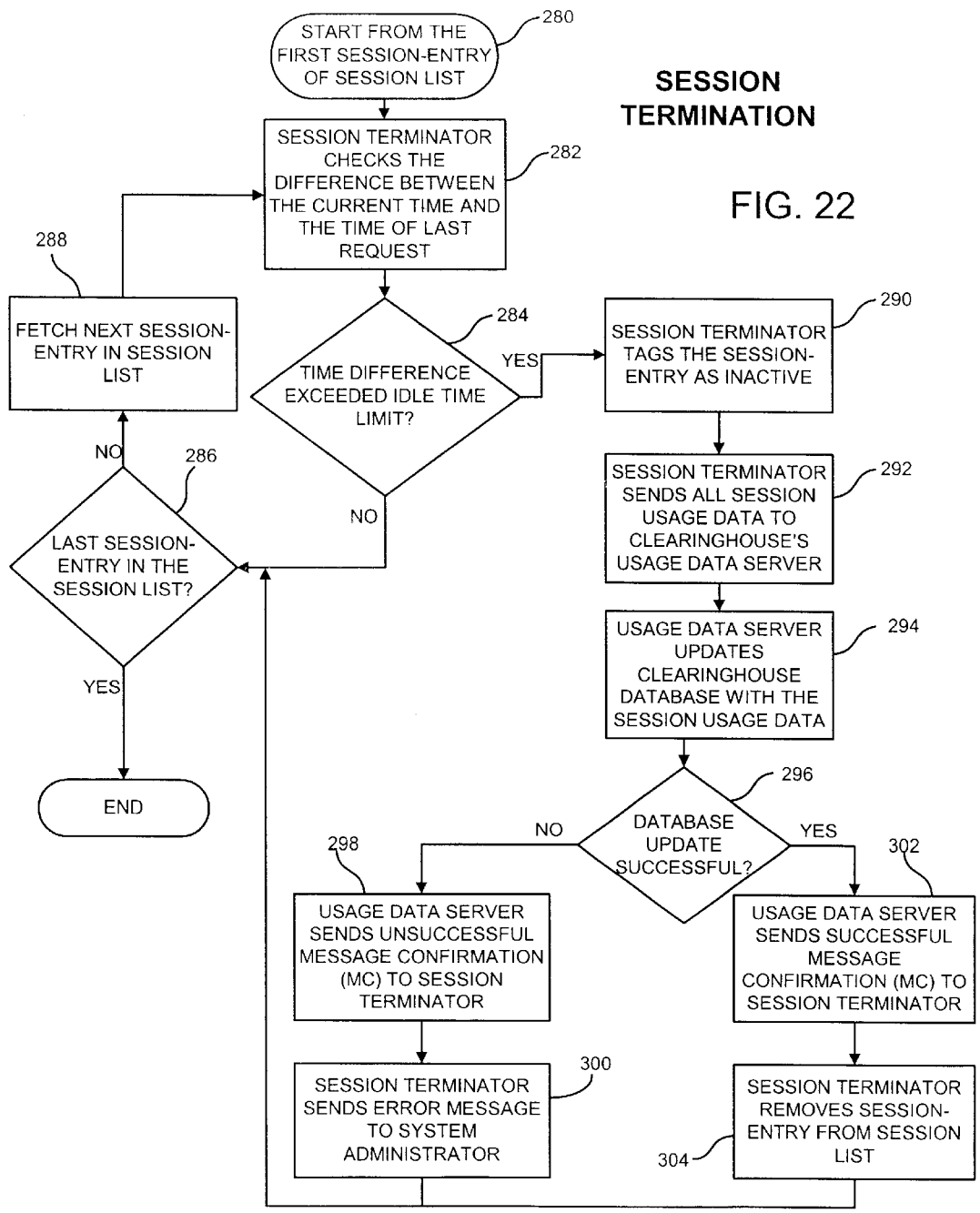
FIG. 22 is a flow chart of the sequence of steps that occur during a session termination.

With respect to session termination and referring to FIG. 22, the first step is to begin with the first session entry of a session list (block 280) and the session terminator checks the difference between the current time and the time of the last request (block 282). If the time difference did not exceed the idle time limit (block 284), the program determines if it was the last session entry in the session list (block 286) and if it was, then the session is terminated (block 288). If it was not the last session entry in the list, the program fetches the next session entry in the list (block 288) and return to block 282. If the time difference did exceed the idle time limit, the session terminator tags the session entry as inactive (block 290) and sends all session usage data to the clearinghouse's usage data server (block 292). The usage data server updates the clearinghouse database with the session usage data (block 294) and the program determines if the update was successful (block 296). If not, the usage data server sends an unsuccessful message confirmation to the session terminator (block 298) and the session terminator then sends an error message to the system administrator (block 300). If the update was successful, the usage data server sends a successful message confirmation to the session terminator (block 302) and the session terminator then removes the session entry from the session list (block 304).

Figure 23:
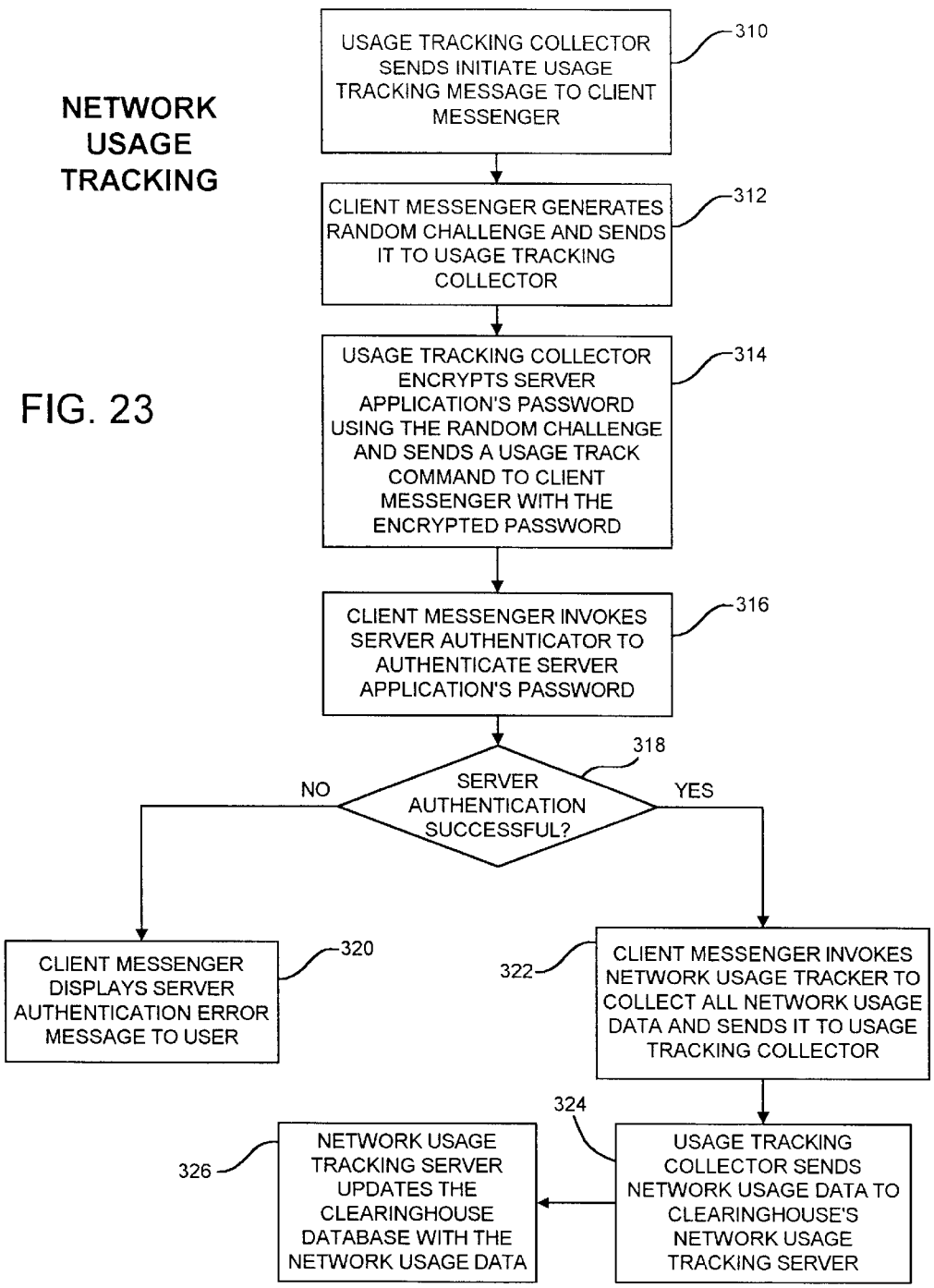
FIG. 23 is a flow chart of the sequence of steps that are taken during network usage tracking.

In accordance with another important aspect of the present invention, the system is adapted to track usage as indicated in the flow chart of FIG. 23. A usage tracking collector sends an initiate usage tracking message to the client messenger (block 310) which generates a random challenge and sends it to the usage tracking collector (block 312). The collector encrypts the server application's password using the random challenge and sends a usage tracking command to the client messenger with the encrypted password (block 314). The client messenger invokes the server authenticator to authenticate the server application's password (block 316) and determines if the authentication was successful (block 318). If not, the client messenger displays the server authentication error message to the user (block 320). If the authentication was successful, the client messenger invokes the network user tracker to collect all network usage data and sends it to the usage tracking collector (block 322) which then sends the network usage data to the clearinghouse's network usage tracking server (block 324) and the server updates the clearinghouse database with the network usage data (block 326).

Figure 24:
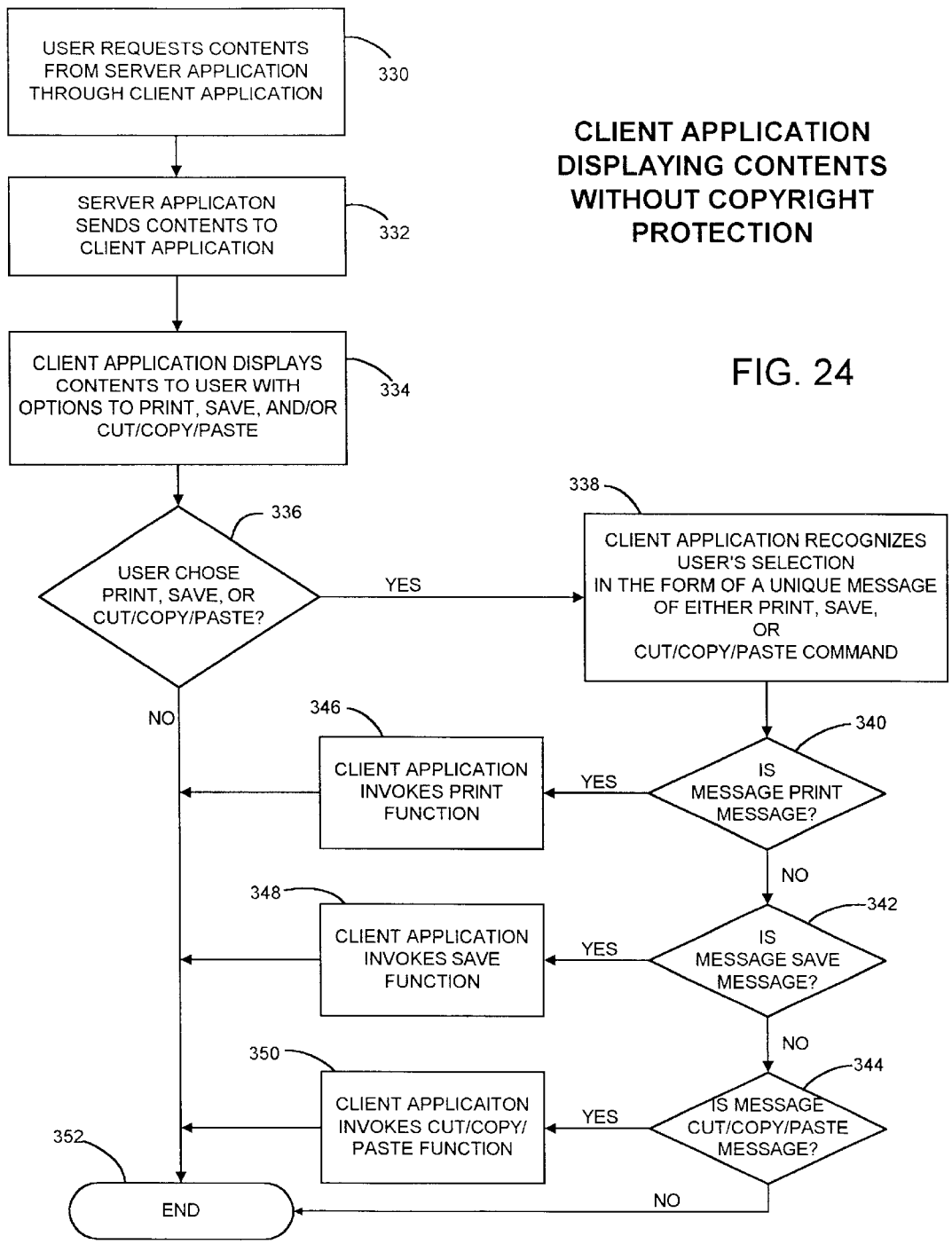
FIG. 24 is a flow chart of the sequence of steps that occur for a user request to display contents that are not copyright protected.

In accordance with still another important aspect of the present invention, the system is adapted to provide copyright or intellectual property protection for preselected contents in the sense that if the content is designated as being protected, a user will be prevented from copying the content in any of the traditional ways. The web browser is selectively disabled from performing print, save or cut/copy/paste functions. During the communication between the user and the server application, the user application looks into the communication headers to see if there are any instructions relating to copyright protection. The copyright protection instruction includes a command to implement the protection and an integer that denotes the level of copyright protection that needs to be implemented. There are preferably seven different levels of protection available, which prohibits selective combinations of print, save and cut/copy/paste disabling, with the highest level 1 preventing all three of these functions. The implementation of the copyright or intellectual property protection is set forth in the flow charts of FIGS. 24–27, with FIG. 24 illustrating the steps that occur for copying contents that are not protected. A user requests the contents from a server application through a client or user application (block 330) which results in the server application sending the contents to the client application (block 332). The client application displays the contents to the user with the options of print, save and cut/copy/paste enabled. The user must then choose which of the three options to implement (block 336). If the user chooses one of the three, the client application recognizes the user selection in the form of a unique message of either print, save or cut/copy/paste command (block 338) and which of those options is chosen is then determined (blocks 340, 342, 344) which results in activation of the particular function (block 346, 348, 350). Invoking one of these then results in the application ending (block 352).

Figure 25:
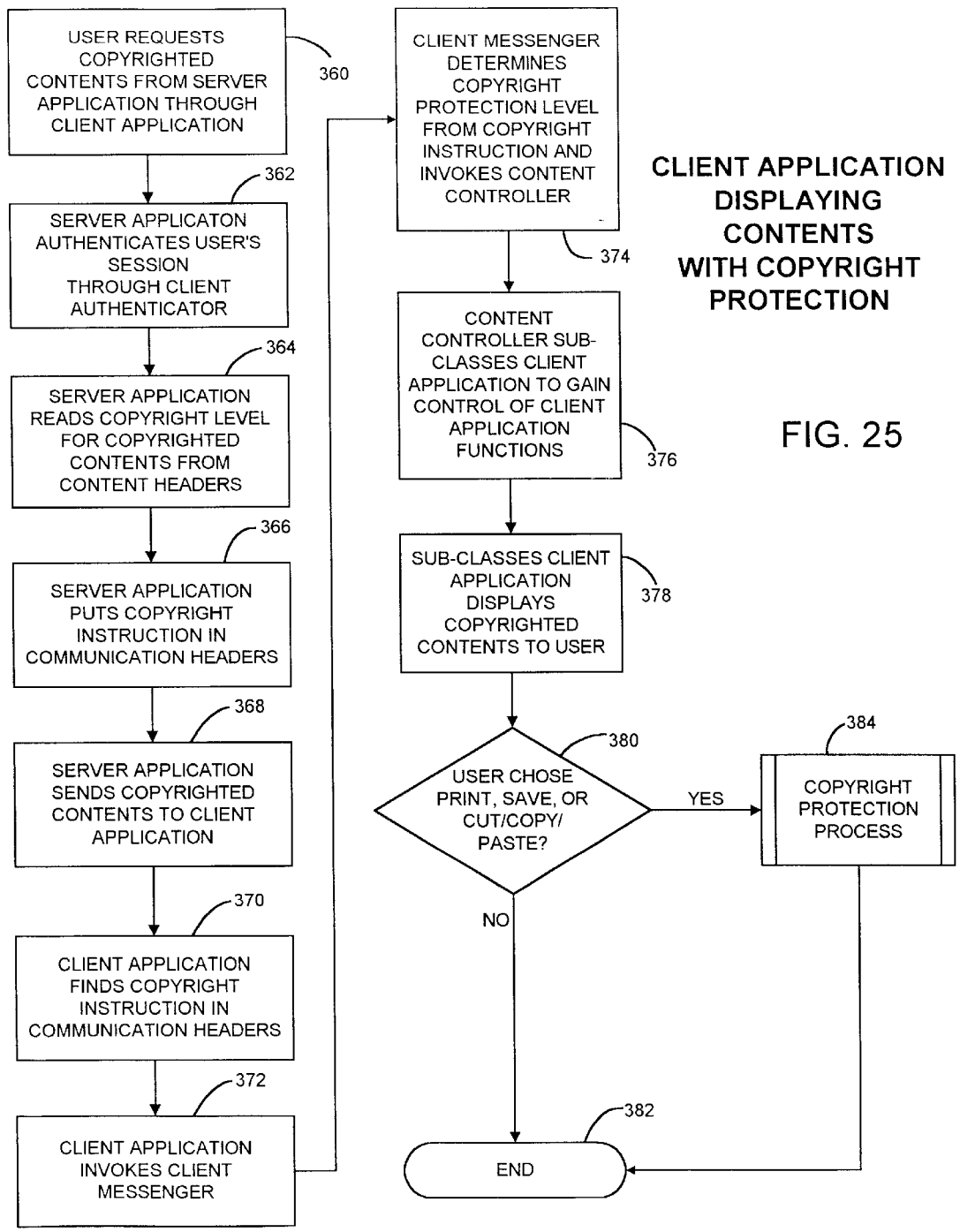
FIG. 25 is a flow chart of the sequence of steps that occur for a user request to display contents that are copyright protected.
Figure 26:
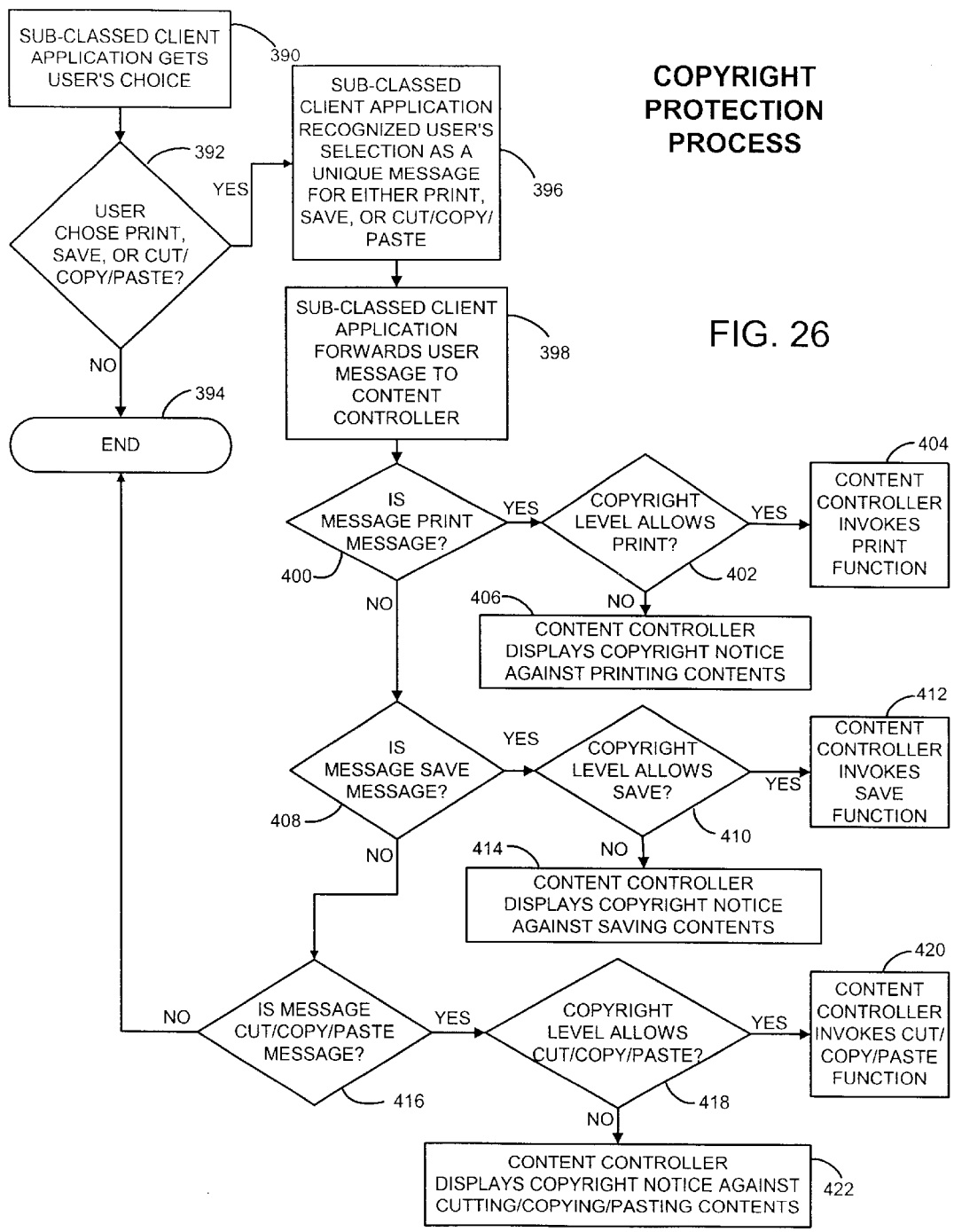
FIG. 26 is a flow chart of the sequence of steps that occur to invoke copyright protection.

With respect to copyright protected material, the flow chart of FIG. 25 shows that when the user requests the copyrighted contents from the server application through the user or client application (block 360), the server application authenticates the user's session through the client authenticator (block 362). The server application reads the copyright level of protection for the content from the content headers (block 364) and puts the copyright instruction in the communication headers (block 366). The server application then sends the copyrighted contents to the client application (block 368) and the client application finds the copyright instruction in the communication headers (block 370). The client application then invokes the client messenger (block 372) which determines the copyright protection level from the instruction and invokes the content controller (block 374). The content controller subclasses the client application to gain control of the client application functions (block 376) and displays the contents to the user (block 378). The program then determines if the user chose a print, save or cut/copy/paste function (block 380), which if not, ends the program (block 382). If the user did choose one of these options, then the copyright protection process (block 384) is invoked. This is shown in FIG. 26 beginning with block 390 and the determination of whether the user chose a print, save or cut/copy/paste option (block 392) which if not, ends the program (block 394). However, if one of those options were chosen, the subclass client application recognizes the user's selection as a unique message for either print, save or cut/copy/paste (block 396) and the subclass client application forwards the user message to the content controller (block 398). The program determines whether the message was a print message (block 400) which if yes, results in the program determining if print is allowed by the copyright level (block 402), and if it does, results in the content controller invoking the print function (block 404). If it does not allow the print function, then the content controller displays a copyright notice prohibiting printing of the contents (block 406). If it was not a print message, the program determines if it was a save message (block 408) and if so, the program determines if save was allowed by the copyright level (410) which if it is, results in the content controller invoking the save function (block 412). However, if it does not allow the save function, the content controller displays the copyright notice again saving contents (block 414). If the message was not a print or a save function, the program determines if it was a cut/copy/paste message (block 416) which if it is, results in the determination of whether the copyright level permits this function (block 418). If it does, then the cut/copy/paste function is invoked (block 420) and if not, results in the copyright notice prohibiting this action (block 422).

Figure 27:
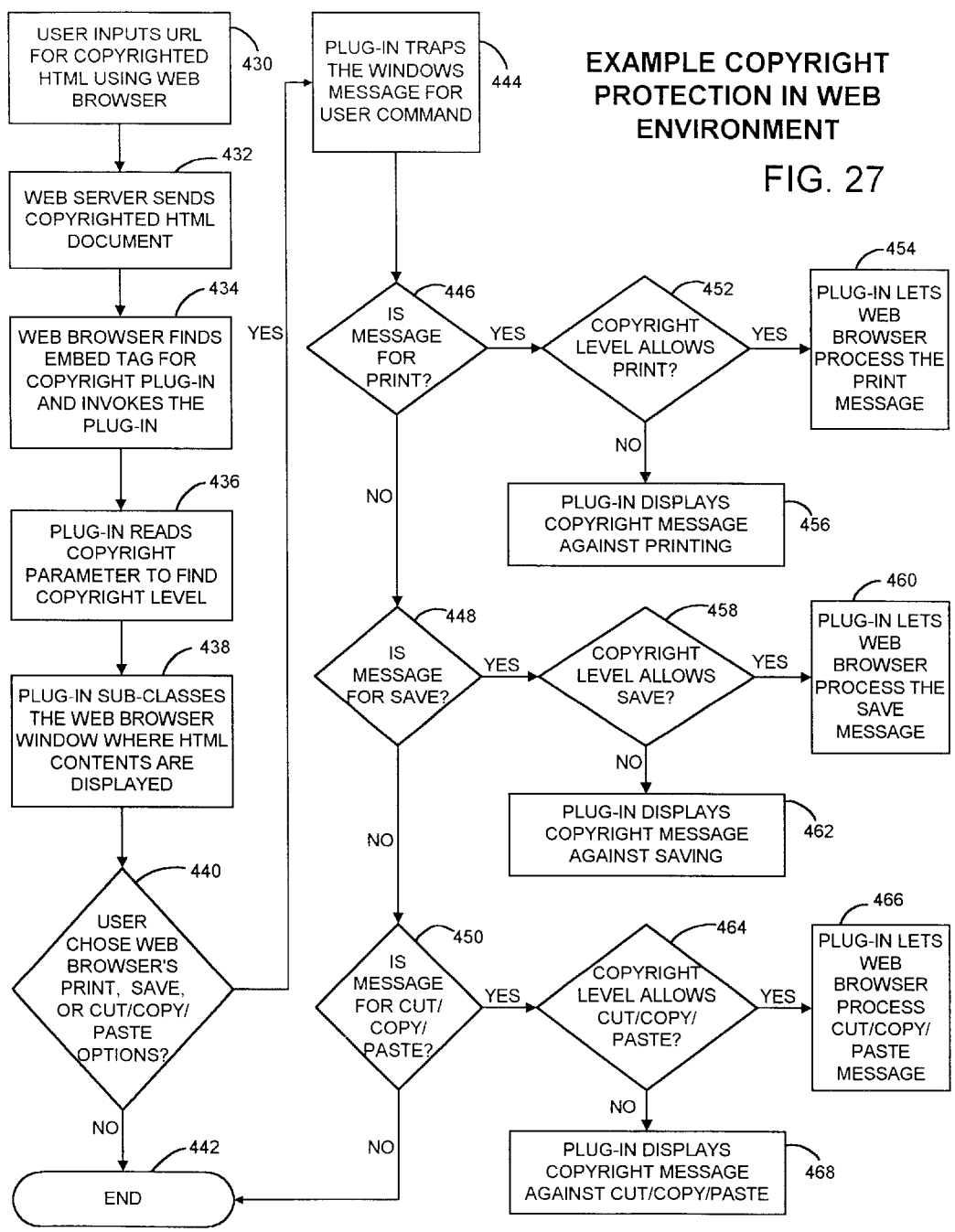
FIG. 27 is a flow chart of the sequence of steps that occur in a worldwide web environment when copyright protection is invoked.

For implementing the copyright protection process in a web environment, the flow chart for this is shown in FIG. 27. The initial block has the user input URL for copyrighted HTML using a web browser (block 430) and the web server sends the copyrighted HTML document (block 432). The browser finds the embedded tag for copyright plug in and invokes the plug in (block 434). The plug in reads copyright parameter which defines the right copyright level (block 436). The plug in subclasses the web browser window where HTML contents are displayed (block 438) and the user chooses one of the print, save or cut/copy/paste options (block 440). If not, the program is ended (block 442). However, if a print, save or cut/copy/paste option is chosen, the plug in traps the window's message for the user command (block 444) and determines if it is a print message (446), a save message (block 448) or cut/copy/paste message (block 450). If it was a print message, the program determines whether the copyright level allows print (block 452) which if it does, permits printing (block 454) or if not, displays a message indicating that printing is not permitted. If it was a save message, the program determines whether the level allows the material to be saved (block 458). If it does, then the material allows the contents to be saved (block 460) or if not, displays a message prohibiting saving (block 462). Finally, if the message was a cut/copy/paste message, the program determines if the level permits this to be done (block 464) which if it does permit it (block 466) or if not, displays a message indicating as much.

Figure 28:
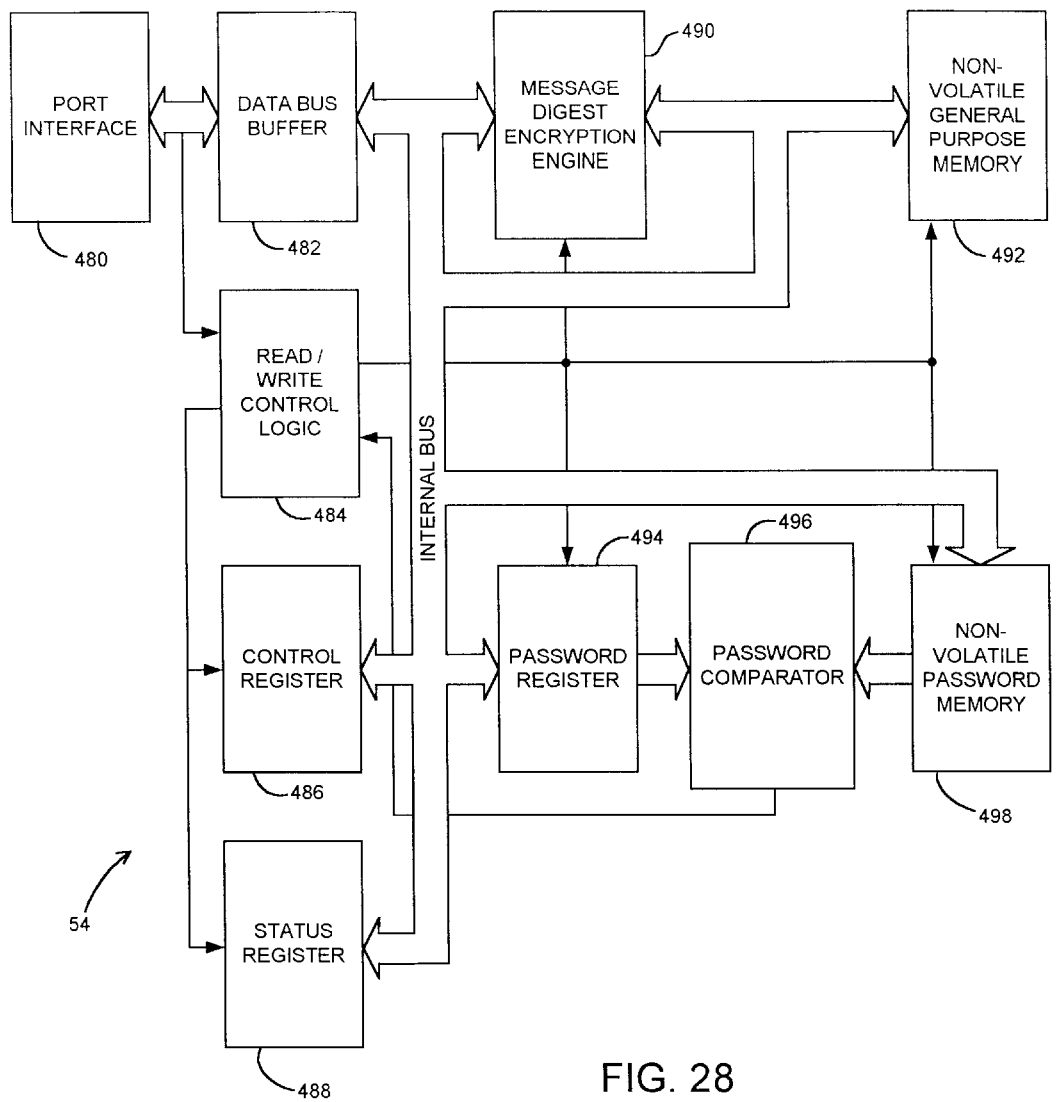
FIG. 28 is a block diagram of the access key that is part of the preferred embodiment of the present invention.

In accordance with another important aspect of the present invention, and referring to FIG. 28, the access key 54 is shown in the illustrated functional block diagram. The access key is an external hardware device such as the a Sentinel Superpro device manufactured by Rainbow Technologies of Irvine, Calif. The key 54 attaches to the personal computer of the subscriber, preferably on the parallel port of an IBM-compatible personal computer or the ADB port on a Macintosh computer. The major function of the key 54 is to uniquely identify a user that desires to access the computer resources of an untrusted network such as the Internet. It is used in conjunction with the user name and password to provide two factor authentication. Generally, two factor authentication provides that something is known, such as the name and password and something is held, such as the physical key that is attached to the computer, or built into the computer. While the Rainbow Sentinel Superpro is the preferred embodiment for an access key, it should be understood that the two factor authentication could be provided by some other physical device such as a credit card, a key, an ATM card, or the like which is known to have been assigned and given to a specific person.

Turning to FIG. 28, the access key 54 includes a port interface 480 which provides an interface to support the personal computer of the subscriber 36. Interfaces may include, but are not limited to, parallel, serial and keyboard ports. The access key is transparent to the personal computer interface being utilized and does not prohibit the personal computer interface from being used in a normal fashion. In the Rainbow Sentinel Superpro key, it is preferred that the key be connected to the parallel port which is transparent to the printing function. The key also includes a data bus buffer 482 which provides a minimum internal data bus of eight bits regardless of the port interface configuration. A read/write control logic block 484 manages all the internal and external transfer of data controlled status. A control register 486 initializes the functional configuration of the access key 54. A status register 488 contains the result of the last operation performed using the control register 486 on the read/write control logic 484. A message digest encryption block 490 is used to encrypt both a nonvolatile general purpose memory 492 during memory read and password read operations. The message digest encryption engine accepts a seed value from the port interface 480 that can be used to uniquely encrypt the data being read. The memory 492 contains a minimum of 1024 bytes of data which can be used for storage of information which personally identifies the user. This information can include, but is not limited to a digital certificate. A password register 494 accepts a minimum of a 64 bit password from the port interface 480 and a password comparator 496 performs a logical XOR on the contents of the password register in the contents of the nonvolatile password memory 492. When the contents of the password register 494 are equal to the contents of the nonvolatile password memory 498, several operations can be performed, including the following: read the nonvolatile general purpose memory, read the encrypted nonvolatile password memory, write the nonvolatile general purpose memory, write the nonvolatile password memory and write a seed value to the message digest encryption engine. The nonvolatile password memory contains a minimum of a 64 bit password. The password is set to a known default value at the time of manufacture but can be reprogrammed at any time.

In accordance with another aspect of the present invention, the manner in which messages are sent among the various components will now be described in connection with the preferred embodiments of the programs that are utilized by the system. In this regard, the following is a listing of the software products that are part of the preferred embodiment of the present invention. The documents identified are specifically incorporated by reference.

---

Subscription Database

Product: Sybase SQL Server XI
Installing Sybase SQL Server for Windows NT
    Sybase SQL Server Release 11.0.x
    Document ID: 34714-1101-02
    Last Revised: March 6, 1996
Introducing Sybase SQL Server for Windows NT
    Sybase SQL Server Release 11.0.x
    Document ID: 31965-1101-02
    Last Revised: February 10, 1996

-continued

Configuring and Administering Sybase SQL Server for Windows NT
    Sybase SQL Server Release 11.0.x
        Document ID: 36446-1101-02
        Last Revised: February 22, 1996
Installing Sybase Products on Sun Solaris 2.x (SPARC)
    Open Client/Server Release 11.1.x
        Document ID: 35075-1100-03
        Last Revised: September 10, 1996
Open Client/Server Configuration Guide for UNIX
    Open Client/Server Release 11.1.x
        Document ID: 35831-1100-02
        Last Revised: August 21, 1996
Open Client/Server Programmer's Supplement for UNIX
    Open Client/Server Release 11.1.x
        Document ID: 35456-1100-04
        Last Revised: August 23, 1996
Sybase SQL Server Utility Programs for UNIX
    Sybase SQL Server Release 10.0
        Document ID: 30475-01-1000-04
        Change Level: 1
        Last Revised: February 1, 1994
Sybase SQL Server System Administration Guide
    Sybase SQL Server Release 10.0
        Document ID: 32500-01-1000-03
        Change Level: 3
        Last Revised: June 17, 1994
Sybase SQL Server Reference Manual: Volume 1 Commands, Functions, and Topics
    Sybase SQL Server Release 10.0
        Document ID: 32401-01-1000-03
        Change Level: 2
        Last Revised: June 17, 1994
Sybase SQL Server Reference Manual: Volume 1 System Procedures and Catalog
    Stored Procedures
    Sybase SQL Server Release 10.0
        Document ID: 32402-01-1000-03
        Change Level: 2
        Last Revised: June 17, 1994
Sybase SQL Server 11 Unleashed
    by Ray Rankins, Jeffrey R Garbus, David Solomon, and Bennett W McEwan
    ISBN # 0-672-30909-2
    Library of Congress Catalog Card # 95-729 19
    Sams Publishing, 201 West 103rd Street, Indianapolis, IN 46290
    Copyright © 1996
Sybase Developer's Guide
    by Daniel J Worden
    ISBN # 0-672-30467-8
    Library of Congress Catalog Card # 93-87172
    Sams Publishing, 201 West 103rd Street, Indianapolis, IN 46290
    Copyright © 1994

ODBC Driver

Intersolv DataDirect ODBC Drivers
    October 1995
    9420 Key West Avenue
    Rockville, Maryland 20850
    MA-ODBC-211-DREF
Intersolv DataDirect ODBC Drivers Installation Guide
    Windows, Windows 95, Windows NT, and OS/2
    October 1995
    9420 Key West Avenue
    Rockville, Maryland 20850
    MA-ODBC-211-INST
Intersolv ServiceDirect Handbook
    Fourth Edition 11/95
    Copyright © 1995
    Intersolv, Inc.
    9420 Key West Avenue
    Rockville, Maryland 20850
    QCS95-S-0231
Inside ODBC by Kyle Geiger
    ISBN # 1-55615-815-7
    Library of Congress Catalog Card # 95-18867
    Microsoft Press
    Copyright © 1995

Server Application (Web Server)

Product: Netscape Enterprise Server

-continued

Netscape Enterprise Server Version 2.0 Administrator's Guide
    Copyright © 1996
    Netscape Communications Corporation
    501 East Middlefield Road
    Mountain View, CA 94043
    802-7610-10
Netscape Enterprise Server Version 2.0 Programmer's Guide
    Copyright © 1996
    Netscape Communications Corporation
    501 East Middlefield Road
    Mountain View, CA 94043
    802-7611-10
Client Application (Web browser)

Product: Netscape Navigator
    Netscape Navigator Gold Authoring Guide
    Copyright © 1996
    Netscape Communications Corporation
    501 East Middlefield Road
    Mountain View, CA 94043
    802-7612-10
Using Netscape
    ISBN # 0-7897-0211-8
    Library of Congress Catalog # 95-67809
    Copyright © 1995
    Que Corporation
    201 W. 103rd Street
    Indianapolis, IN 46290
Access Key Product: Rainbow Technologies' Sentinel SuperPro Key
Sentinel SuperPro Software Protection Developer's Guide
    by Rainbow Technologies
    Part Number 700141-001 Revision D
    Software Releases 4.0 and Later
    Driver Releases 5.0 and Later
    Copyright © 1991-1995 Rainbow Technologies, Inc.
    50 Technology Drive, Irvine, CA 92718

Figure 29:
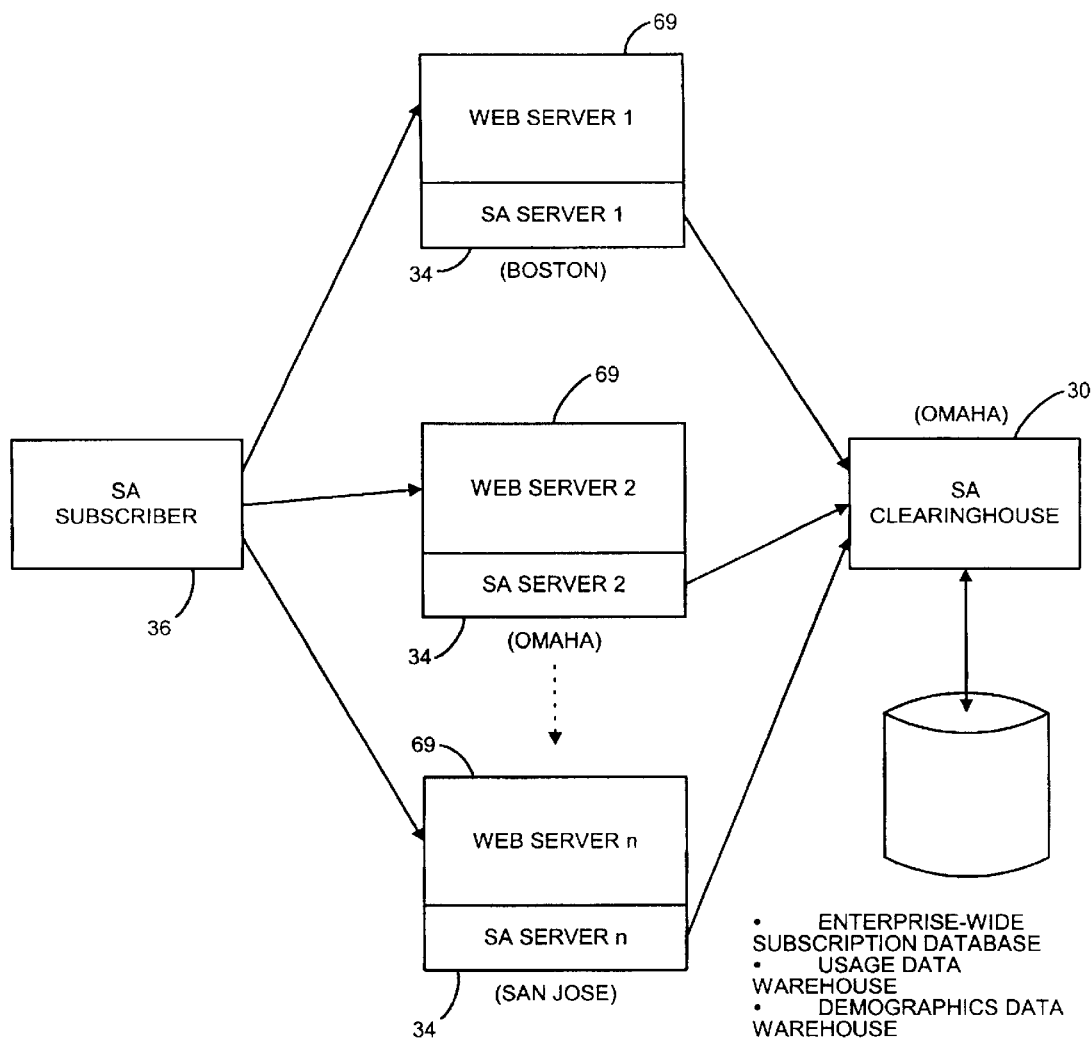
FIG. 29 is a functional block diagram which illustrates multiple system servers with a single system clearinghouse.

The distributed architecture of the system software enables multiple web servers 69, each of which may host their own copy of a server 34 to communicate and interact with one or more clearinghouses 30. As shown in FIG. 29, there are multiple servers 69 residing in a geographically distributed manner on the Internet, each one of them with their own copy of a subscription access server. The clearinghouse 30 contains the enterprise wide subscription database, the usage and demographics data warehouse, and controls the authentication and authorization of subscribers on all the web servers 69.

When a subscription access subscriber attempts to access any subscription access protected content from any one of these web sites, the respective server 69 for that web site will need to authenticate the subscriber. In order to perform subscriber authentication, the subscription access server will need to interact with the system clearinghouse 30, which it does by establishing and maintaining a communication line between itself and the clearinghouse. The information transmitted on this communication line is encrypted using a public/private key mechanism so that only authentic servers and an to authentic subscription access clearinghouse can communicate with each other. The server 69 also implements the same mechanism in sending usage transaction data to the subscription access clearinghouse's data warehouse.

The other subscription access servers interact with the subscription access clearinghouse 30 in the same manner. Thus an online content provider can host several geographically distributed Interned web sites. Once a subscription access subscriber is authenticated at one of the system enabled web sites, that subscriber can access other subscription access enabled web sites transparently using the same username, password, and the optional access key 54, without having to reenter username and password information. All the usage transaction data generated by the subscriber on all these different enabled web sites will be reported back to the clearinghouse, regardless of how the subscriber accesses the different enabled web servers 69.

Figure 30:
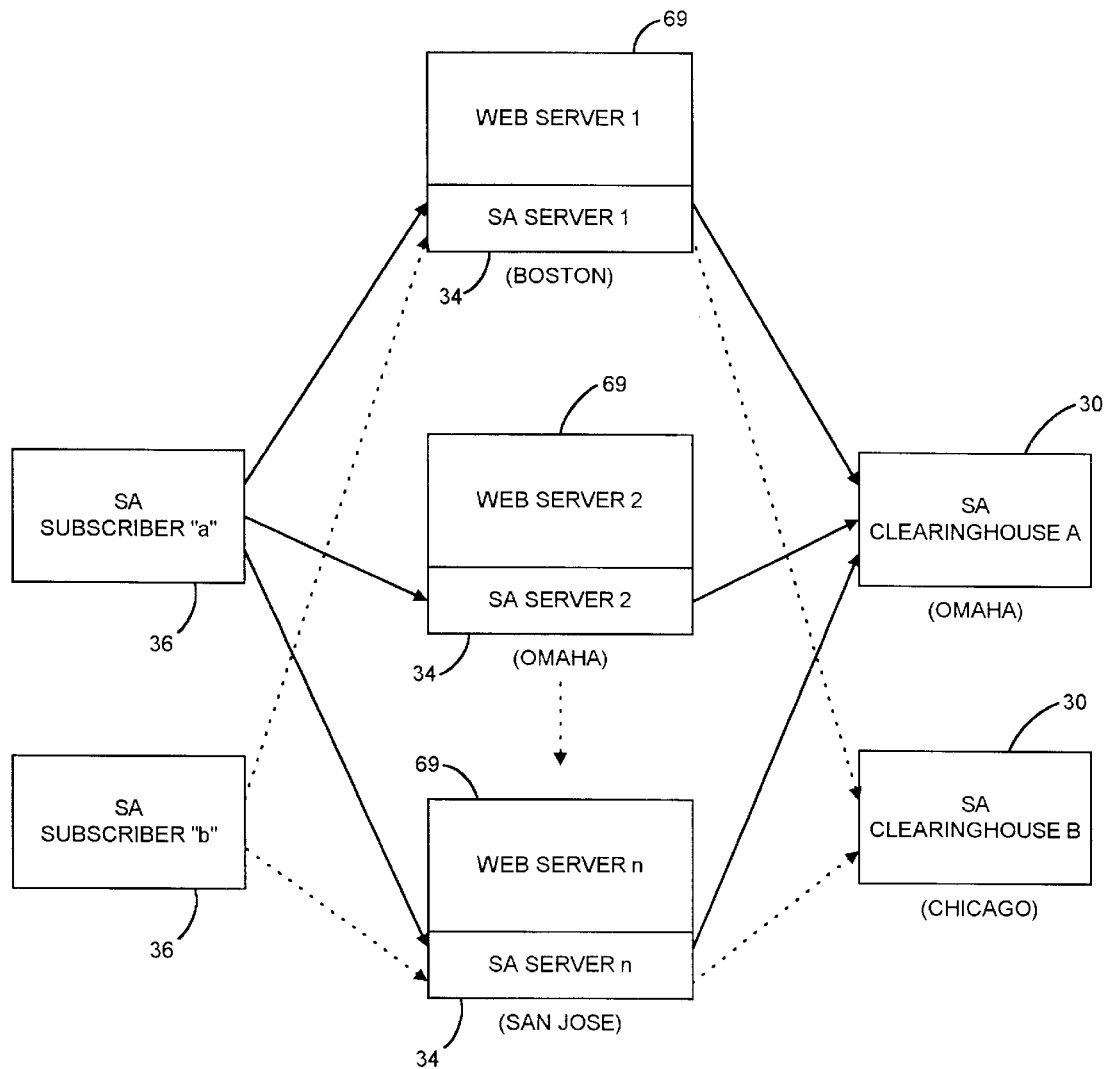
FIG. 30 is a functional block diagram illustrating a system having multiple system servers and multiple system clearinghouses.

In the configuration of FIG. 29, all the servers were being controlled by the same clearinghouse 30. However, the distributed architecture of subscription access can be further extended to allow multiple subscription access servers to interact with multiple clearinghouses 30. As shown in FIG. 30, there are two subscription access clearinghouses—clearinghouse A in Omaha, and clearinghouse B in Chicago. Each clearinghouse contains the business rules for subscription services, enforced by the individual clearinghouse's enterprise wide subscription database. Assume that subscriber "a" is registered with subscription access clearinghouse A, and subscription access subscriber "b" is registered with subscription access clearinghouse B. Since each server 69 can protect several different subscriptions at the same web site, the server can be configured to protect different subscriptions through different subscription access clearinghouses. For example, server 1 in Boston can be hosting two separate subscriptions—subscription A and subscription B, and subscription A is available for subscribers who are registered at subscription access clearinghouse A, and subscription B is for clearinghouse B subscribers. In this case, the server is doing all the authentication, authorization and usage data updates for subscription A through clearinghouse A, and subscription B through clearinghouse B. This scenario fits perfectly for an information provider like entity who wants to provide hosting services for different content publishers. The provider can run a web site with a copy of the subscription access server, and host different subscription contents through the subscription access server, where different subscriptions services are being controlled by different subscription access clearinghouses.

This also presents the possibility of subscription access clearinghouses forming alliances with one another. For instance, in our example above, let's suppose clearinghouse A and clearinghouse B form a joint agreement that they will let each other's subscribers access each other's subscription services, and each clearinghouse will pay a share of the dividend to the other based on subscription usage. In order to do this, system servers will need to be configured to perform authentication from both clearinghouses. As a result, a subscriber who is registered with clearinghouse A can access subscription services which fall under clearinghouse B.

With regard to the case of server 1 hosting subscriptions A and B, since now a subscription access subscriber registered with clearinghouse A can also access subscription services that fall under clearinghouse B, subscriber "a" should be able to access subscription B through server 1. In order to do this, the server 1 will need to change its configuration so that it is able to separate clearinghouse A subscribers from clearinghouse B subscribers. When subscriber "a" tries to access protected contents, subscription access server 1 will interact with subscription access clearinghouse A to do authentication, and if it is subscriber "b", subscription access server 1 will interact with subscription access clearinghouse B.

However, the usage data for a particular subscription will be sent to the clearinghouse who owns the subscription. So even if subscribers from clearinghouse A can now access subscription B, all their usage data will still be sent to clearinghouse B. Thus, to all of subscriber "a" is usage data regarding subscription B and go to clearinghouse B. In this way, clearinghouse B knows how many subscribers from other clearinghouses have accessed subscriptions that belong to clearinghouse B, and based on that data, clearinghouse B will be able to charge other subscription access clearinghouses.

The Internet Subscription Access (ISA) system is the preferred embodiment of the present invention in the web environment. The following table lists the ISA software components as they relate to the present invention:

| Preferred Embodiment Component | ISA software component |
|---|---|
| Clearinghouse user authentication daemon | userauthd |
| Clearinghouse usage daemon | usaged |
| Clearinghouse URL tracking daemon | urltrackd |
| Clearinghouse administration software | ch_admin.exe |
| ISA Server Session Manager | sessiond |
| ISA shard object for Web server | isa.so |
| ISA log-in CGI's | start_login.cgi |
| | login.cgi |
| | vrfypswd.cgi |
| ISA reauthentication CGI's | check_key.cgi |
| | verify_key.cgi |
| URL tracking CGI | urltracking.cgi |
| ISA online application CGI's and HTML | application.html |
| | application.cgi |
| | subscriber.cgi |
| | verify_applicant.cgi |
| ISA online activation CGI's | activate.cgi |
| | check_activate.cgi |
| ISA password change CGI's | pswd_chg_form.cgi |
| | chg_pswd.cgi |
| ISA Site Administration CGI's | add_profile.cgi |
| | del_subs.cgi |
| | srvconf.cgi |
| | admin_subs.cgi |
| | profile.cgi |
| | stadmin.cgi |
| | chng_srvconf.cgi |
| | data_dumprestore.cgi |
| | smgr_restart.cgi |
| | upd_profile.cgi |
| | data_recovery.cgi |
| | smgr_start.cgi |
| | upd_subs.cgi |
| | del_profile.cgi |
| | smgr_stop.cgi |
| ISA Subscriber software | ISA Client Plug-in |
| | ISA ActiveX component |

Following is a description how these ISA components can be configured initialized, and how their day-to-day operation can be monitored. It should be understood that the component names used in these descriptions are specific to ISA, and the procedures described to perform the day-to-day operation are specific to ISA components, more so as an example of the preferred embodiment of the present invention in the web environment.

With respect to the configuration files that are necessary for operating the various software components of the system, each component has its own configuration file as shown below:

| Daemon/Server | Configuration Filename |
|---|---|
| User Authentication | userauthd.conf |
| Usage | usaged.conf |
| URL Tracking | urltrackd.conf |
| Session Manager | sessiond.conf |
| Web Server | magnus.conf |
| | obj.conf |
| | mime.types |

Each daemon accepts the name of its configuration file as a command line argument when starting the daemon. The format of the command line is:

<daemon name><configuration file>.

The clearinghouse daemons can be started by using standard shell scripts.

For the user authentication daemon (userauthd.conf), the following configuration files apply:

| Parameter | Description |
|---|---|
| logdir | Absolute pathname specification of the directory which this daemon is to create its log files in. Two instances of the same daemon type (e.g., userauthd) cannot log to the same directory. The daemon will not start up if it is unable to write to the directory. |

-continued

| Parameter | Description |
|---|---|
| service | Specifies the TCP port number which the daemon is to use to listen for requests. This can be a numeric or alphanumeric entry. If the entry is alphanumeric, there should be a corresponding entry in the /etc/services/ file. |
| dbserver | The name of the database server to connect to. This entry should correspond to an entry in the database server interface file. |
| dname | The name of the database to use. A database server can control many databases. |
| dbuser | The name of the database user to use when connecting to the database. Database users can be used to control what processes (or daemons) can connect to the database and also what permissions they have when they connect. Typically all clearinghouse components will use the same database server name, database name, database username and hence database user password entries in their configuration files. |
| dbpswd | The password to use for the above database user. The file permissions for this configuration should be set according knowing that it contains a database username and password. |

For the usage daemon (usaged.conf), the following configuration files apply:

| Parameter | Description |
|---|---|
| logdir | Absolute pathname specification of the directory which this daemon is to create its log files in. Two instances of the same daemon type (e.g., usaged) cannot log to the same directory. The daemon will not start up if it is unable to write to the directory. |
| service | Specifies the TCP port number which the daemon is to use to listen for requests. This can be a numeric or alphanumeric entry. If the entry is alphanumeric, there should be a corresponding entry in the /etc/services/ file. |
| dbserver | The name of the database server to connect to. This entry should correspond to an entry in the database server interface file. |
| dname | The name of the database to use. A database server can control many databases. |
| dbuser | The name of the database user to use when connecting to the database. Database users can be used to control what processes (or daemons) can connect to the database and also what permissions they have when they connect. Typically all clearinghouse components will use the same database server name, database name, database username and hence database user password entries in their configuration files. |
| dbpswd | The password to use for the above database user. The file permissions for this configuration should be set according knowing that it contains a database username and password. |

For the URL tracking daemon (urltrackd.conf), the following configuration files apply:

| Parameter | Description |
|---|---|
| lockfile | Absolute filename specification of a file to use to ensure that only one copy of the URL tracking daemon is running. |
| logfile | Absolute filename specification of the basename which this daemon uses when creating log files. The daemon will add two suffixes to the basename: the date and a process ID number. The basename will become basename.mmdd.pid. If the logfile entry were /export/local/chouse/urltrack/log/ urltrackd.log then the complete filename would be: /export/local/chouse/urltrack/log/urltrackd.log.0501.11313. |
| service | Specifies the TCP port number which the daemon is to use to listen for requests. This can be a numeric or alphanumeric entry. If the entry is alphanumeric, there should be a corresponding entry in the /etc/services file. |
| dbserver | The name of the database server to connect to. This entry should correspond to an entry in the database server interface file. |
| dname | The name of the database to use. A database server can control many databases. |
| dbuser | The name of the database user to use when connecting to the database. Database users can be used to control what processes (or daemons) can connect to the database and also what permissions they have when they connect. Typically all clearinghouse components will use the same database server name, database name, database username and hence database user password entries in their configuration files. |
| dbpswd | The password to use for the above database user. The file permissions for this configuration should be set according knowing that it contains a database username and password. |

For the session manager (sessiond.conf), the following configuration files apply:

| Parameter | Description |
|---|---|
| SESSIOND_UDP_PORT | Specifies the UDP port which the session manager will use to list for requests from CGI programs. |
| SESSIOND_TCP_PORT | Specifies the TCP port which the session manager will use to listen for replies from the clearinghouse. |
| CLEARINGHOUSE_HOST | The UNIX host name that the clearinghouse server is running on. When the session manager communicates with the clearinghouse, this entry forms part of the address. |
| CLEARINGHOUSE_PORT | This entry specifies the TCP port which the session manager should use when communicating with the clearinghouse usage daemon. The session manager uses this entry and the CLEARINGHOUSE_HOST entry to build the complete address for the usage daemon. This port number should match the port number defined in the service entry of the usage daemons configuration file. |

| Parameter | Description |
| --- | --- |
| CLEARINGHOUSE_URL_PORT | This entry specifies the TCP port which the session manager should use when communicating with the clearinghouse URL tracking daemon. The session manager uses this entry and the CLEARINGHOUSE_HOST entry to build the complete address for the URL tracking daemon. This port number should match the port number defined in the service entry of the URL tracking daemons configuration file. |
| CLEARINGHOUSE_AUTH_PORT | This entry specifies the TCP port which the session manager should use when communicating with the clearinghouse user authentication daemon. The session manager uses this entry and the CLEARINGHOUSE_HOST entry to build the complete address for the user authentication daemon. This port number should match the port number defined in the service entry of the user authentication daemons configuration file. |
| COMPANY_NO | Unique ID assigned to each company defined with the subscription access server system. |
| SUBSCRIPTION_ID | Unique ID assigned to each subscription defined for a company in the subscription access server system. |
| KEYCHECK_INTERVAL | The number of seconds that will elapse before the subscription access server asks the browser to check for the existence of the access key. |
| REFRESH_TIME | The amount of time (in seconds) that must expire without any session activity before a session is considered inactive and terminated. |
| SESSION_REFRESH_INTERVAL | The amount of time (in seconds) that must elapse with no new connection requests to the subscription access server, which will cause the subscription access server to stop listening for incoming connections and go examine the its internal session table to see if any sessions have become idle (refresh time has expired for the session). It will clean up idle sessions and resume listening for incoming connection requests. |
| LOCAL_URL_TRACK | Indicates if the URL tracking data is stored on a local database as well as being sent to the subscription access clearinghouse for storage. Valid entries are YES or NO. |
| LOCAL_USAGE_TRACK | Indicates if the usage tracking data is stored locally as well as being sent to the subscription access clearinghouse for storage. Valid entries are YES or NO. |
| MAX_RESEND_NO | If the subscription access server does not get a confirmation message back from the subscription access clearinghouse for information it sent to the subscription access clearinghouse, the subscription access server will resend the data until we get a confirmation message or until the maximum times to resend usage data has been exceeded. |
| ADMIN_EMAIL_ADDR | When an event occurs that requires intervention from an administrator, notification is sent to this email address. |
| MAIL_BIN | Absolute filename specification of the program to use to send email notification to the person defined in ADMIN_EMAIL_ADDR. |
| URLTRACK_INTERVAL | Specifies the duration between URL tracks. Duration is specified in minutes. |
| USAGE | This defines the granularity of the usage data which the session manager records about a session. There are two valid entries: SESSION or TRAN. TRAN indicates that the session manager should record information about every transaction which occurred in a session. SESSION indicates that only information regarding the session should be stored, i.e., session start and end times, user ID, number of transactions which occurred in session manager. |
| LOCAL_AUTHENTICATION | Indicates if user authentication should be performed against a local database as opposed to the clearinghouse database. Valid entries are YES or NO. YES indicates that authentication should be performed locally, while NO indicates the opposite. |
| RUNTIME_DIR | This is the default directory for the subscription access server. Here is where the subscription access server will create log files and other dynamic run time files required for successful operation. |

For the web server (magnus.conf), in order that the system shared object 66 component works correctly with the web server, the following changes need to be made to the magnus.conf file:

```

# load the subscription access specific NSAPI functions

Init fn=load-modules shlib=/usr/ns-home/bin/load_modules/isa.so

#call init-isa to initialize isa server specific NSAPI
#variables

Init fn=init-isa
Sm_host=localhost
login_url=http://10.199.199.7/cgi-bin/gatekpr/login.cgi
keycheck_url=http://10.199.199.7/cgi-bin/gatekpr/check_key.cgi
smerr_url=http://10.199.199.7/gatekpr/session_err.html
accessd_url=http://10.199.199.7/gatekpr/accessd_err.html
urltrack_url=http://10.199.199.7/cgi-bin/gatekpr/track_test.cgi
```

It should be noted that all the <variable>=<value> pairs listed above should appear on the line beginning Init if and should be separated with spaces. Each variable/pair value was listed on a separate line to aid clarity.

The following describes the meaning of each of NSAPI variables:

| | |
|---|---|
| Sm_host: | hostname or the IP address of the machine hosting session manager daemon(s) |
| login_url: | URL for the subscription access login CGI |
| keycheck_url: | URL for subscription access reauthentication CGI |
| smerr_url: | URL for error HTML for session manager errors (configurable) |
| accessd_url: | URL for the URL tracking CGI |
| urltrack_url: | URL for the URL tracking CGI |

For the web server (obj.conf), for each directory protected by the subscription access system, the following entries need to be inserted in obj.conf:

```
<Object ppath="/usr/ns-home/htdocs_unsecure/demosite/*">
PathCheck fn="restrict-by-isa"
log_head="prism_login.txt"
session_port="50420"
trailer="prism_tail.txt"
err_head="prism_err.txt"
digest="5"
AddLog fh="log-end"
</Object>
```

Once again, each entry was placed on a separate line for clarity but when adding them to the configuration file all the entries should be on the same line, separated by spaces.

The variable meaning is as follows:

| | |
|---|---|
| log_head: | text file containing the HTML header tags for the login page |
| session_port: | session manager's port number |
| trailer: | text file containing the HTML trailer tags for login page and error pages |
| err_head: | text file containing the HTML header tags for error pages |
| digest: | message digest type to use for one-time-password encryption (4-MD4; 5-MD5) |

For the web server configuration file (mime.types), one line needs to be added to the mime.types configuration file. The line is:

type=application/x-protect exts=pro

The positioning of the new line within the configuration file is not important. Adding this line enables any file with the extension .pro to automatically invoke the client side software to process the file.

With respect to routine operating procedures, there are general guidelines for the orderly start up and shutdown of the system of the present invention. To start up the system, there are a sequence of activities that are involved. First, each server should be configured through its configuration files. Each of the clearinghouse servers is started by a series of shell strips, which in a typical installation, will be in the directory named /USR/local/isa/clearinghouse. The /USR/local part of the previous pathname was the directory specified at installation time. The scripts are named start_userauthd.sh, start_usaged.sh and start_urltrackd.sh. After the scripts are executed, the PS-EF command is used to check if the following processes exist: userauthd, usaged and urltrackd. The next step is to start up the database server which requires login as the user sybase. This login will have an environment variable called SYBASE which defines what directory SYBASE was installed to. It is necessary to move to the directory $SYBASE/bin. For each database server to be started, there is a filed called RUN_<SERVER_NAME>. If two database servers called isa and isa_backup were created during the installation, the start up files would be called RUN_ISA and RUN_ISA_BACKUP. This start up file should be used in conjunction with the start server program. The exact syntax is: start server {-f <startup files>}. To continue the example from above, the command would be: start server -f RUN_ISA -f RUN_ISA_BACKUP.

With respect to the session manager, it can be started by a shell script and there will be one instance of the session manager per subscription per company. If the installation directory was specified to be /usr/local then the session manager start up scripts will be found ID at /usr/local/isa/sessionmgr. The naming convention for the start up scripts is: start_<subscription name>.sh. Each subscription will have its own directory off of /usr/local/isa/sessionmgr.

With respect to the web server, once its configuration files have been modified as indicated above, the subscription access component will automatically be used once the web server is started. As web servers from different vendors require different start up procedures, it is assumed that this information is already known.

With respect to shutdown, of the system and particularly the web server, it is best to start with the subscription access server as this is the first point of contact for the user's browser. Like the start up procedure for the web server, the shutdown procedure will differ for each different web server.

With respect to the session manager, it is recommended that shutdown of it be done from within the server side administration program. The browser should be pointed at the URL where the server site administration program is located and the administer button for the session manager that is wanted to be stopped should be clicked. A data dump on the session manager should be performed before stopping it to avoid loss of data contained within the manager to be stopped. This is executed by entering the complete passname of the data dump file and clicking the data dump button. With respect to the clearinghouse, the clearinghouse daemons are shutdown using the kill command. The process identification numbers for each of the servers should be found by getting a list of all processes and searching for the process names of the start up procedures. Once the process identification numbers have been established, the command kill -9<pid>{<pid>} should be used.

With respect to the database server, it can be shutdown using the following steps:

```
login into isql as the system administrator
type "shutdown <backup database server name>"
type "go"
type "shutdown"
type "go"
hadji:>isql -Usa -P -SISA
1>shutdown SYB_BACKUP
2>go
Backup Server: 3.48.1.1: The Backup Server will go down
immediately.
Terminating sessions.
1>shutdown
2>go
Server SHUTDOWN by request.
The SQL Server is terminating this process.
00:97/05/14 14:52:40.23 server SQL Server shutdown by
request.
```

It should be understood from the foregoing that a subscription access system has been shown and described which enables an information provider to have total control over user access, rights management, billing, usage tracking and demographic capture over an untrusted network such as the Internet world wide web. The system has many desirable attributes and features which enable it to provide such functionality. Moreover, it is extremely flexible in that it can operate to function with multiple servers and multiple clearinghouses if desired. The system can be used to designate content, such as copyrighted material, so that the material cannot be copied in any of the traditional ways. Moreover, two-factor authentication enables the system to frequently determine if a user is authentic and the system also functions to authenticate servers as well. A prominent feature of the system of the present invention is that it provides a secure platform for information providers to publish subscription contents to the world wide web in a way that assures revenue generation.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for controlling the operation of and access to selected computer resources of at least a first server computer by at least one subscriber client computer via an untrusted network in an operating session, without necessarily controlling access to other computer resources provided by the first server computer and by other server computers and nonsubscriber client computers, comprising:

clearinghouse means for storing identity data of said first server computer and the identity data of each of said subscriber client computers;

server software means installed on said first server computer adapted to forward its identity data and identity data of each subscriber client computer to said clearinghouse means at the beginning of an operating session in which access to selected computer resources of said first server computer is requested;

client software means installed on each of said subscriber client computers adapted to forward its identity data to said first server computer at the beginning of an operating session in which access to selected computer resources is requested;

at least one hardware key connected to the subscriber client computer, said key being adapted to generate a predetermined digital identification, which identification is part of said identity data;

said server software means installed on the first server computer being adapted to selectively request the subscriber client computer to forward said predetermined digital identification to the first server computer to thereby confirm that said hardware key is connected to said subscriber client computer;

said clearinghouse means being adapted to authenticate the identity of said subscriber client computer responsive to a request for selected computer resources of said first server computer by a subscriber client computer;

said clearinghouse means being adapted to authenticate the identity of said first server computer responsive to said subscriber client computer making the request for selected computer resources of said first server computer; and, said clearinghouse means being adapted to permit access to said selected computer resources responsive to successful initial authentication of said first server computer and of said subscriber client computer making first request.

2. A system as defined in claim 1 wherein the untrusted network is the Internet.

3. A system as defined in claim 1 wherein said subscriber client computer identity data includes a client name, a client password and said predetermined digital identification.

4. A system as defined in claim 1 wherein successive ones of said intermittent requests occur at predetermined time intervals.

5. A system as defined in claim 1 wherein said clearinghouse means provides authentication confirmation data to said subscriber client computers and to said first server computer when the identities of the same are authenticated, said authentication confirmation data being encrypted in subsequent communications from each of said first server computer, subscriber client computer and clearinghouse means to another of said first server computer, subscriber client computer and clearinghouse means.

6. A system as defined in claim 1 wherein said first server computer has the ability to change said predetermined digital identification of the hardware key connected to each of said subscriber client computers, said changed predetermined digital identification being transmitted to said clearinghouse means.

7. A system as defined in claim 1 further characterized in that it is adapted to monitor the communications between said first server computer and each subscriber client computer during operating sessions and acquire and store demographic data for each subscriber client computer.

8. A system as defined in claim 7 wherein said demographic data comprises personal profile information, including at least two of the following items of information including: user name, user password, address, type of browser used, operating systems used, phone number, job title, name of employer, type of business, credit card identification and credit card number.

9. A system as defined in claim 7 wherein said demographic data comprises the history of all URL sites visited by a subscriber client computer.

10. A system as defined in claim 1 further characterized in that it is adapted to monitor the communications between said first server component and each subscriber client computer during operating sessions and acquire and store billing data based upon the subscriber client computer's usage of server computer resources.

11. A system as defined in claim 1 further including at least two server computers and at least two clearinghouse means, said server computers and clearinghouse means being capable of being at separate physical locations.

12. A system as defined in claim 1 wherein said clearinghouse means is adapted to operate as an independent entity and can provide said authentication operations for multiple server computers.

13. A system as defined in claim 1 wherein said server computer is adapted to selectively query each of said subscriber client computers to generate said predetermined digital identification during an operating session, each of said subscriber client computers generating said digital identification in response to said query.

14. A system as defined in claim 13 wherein said server computer's selective querying of subscriber client computers occurs by operation of query algorithms, said server computer being adapted to change said query algorithms.

15. A system as defined in claim 1 wherein said server computer is adapted to selectively prompt said subscriber client computers to enter its identity data including its username and password in the beginning of an operating session.

16. A system as defined in claim 1 wherein said first server computer is adapted to assign one of a plurality of authorization levels to the computer resources provided by said first server computer, said identity data of each of said subscriber client computers including a particular authorization level, said first server computer only permitting access to particular computer resources by a subscriber client computer that are permitted by said particular authorization level.

17. A system as defined in claim 16 wherein said computer resources are contained in a plurality of directories containing files, said authorization levels being assigned on a directory level.

18. A system as defined in claim 16 wherein said computer resources are contained in a plurality of directories containing files, said authorization levels being assigned on a file level.

19. A system for controlling the operation of and access to selected computer resources of at least a first server computer by at least one subscriber client computer via an untrusted network in an operating session, without necessarily controlling access to other computer resources provided by the first server computer and by other server computers and nonsubscriber client computers, and each of said subscriber client computers has a standard browser application for browsing the untrusted network, comprising:

clearinghouse means for storing identity data of said first server computer and the identity data of each of said subscriber client computers;

server software means installed on said first server computer adapted to forward its identity data and identity data of each subscriber client computer to said clearinghouse means at the beginning of an operating session in which access to selected computer resources of said first server computer is requested; and, client software means installed on each of said subscriber client computers adapted to forward its identity data to said first server computer at the beginning of an operating session in which access to selected computer resources is requested;

said clearinghouse means being adapted to authenticate the identity of said subscriber client computer responsive to a request for selected computer resources of said first server computer by a subscriber client computer;

said clearinghouse means being adapted to authenticate the identity of said first server computer responsive to said subscriber client computer making the request for selected computer resources of said first server computer;

said clearinghouse means being adapted to permit access to said selected computer resources responsive to successful initial authentication of said first server computer and of said subscriber client computer making said request;

said server software means installed on the first server computer being adapted to designate specific resource content as being protected and to provide predetermined protection data identifying said resource content as being protected when said data is transmitted to one of said subscriber client computers responsive to a request for said resource content;

said client software means installed on each of said subscriber client computers being adapted to monitor said data defining a hierarchical system of protection and selectively disable predetermined application functions of the standard browser application previously installed on said subscriber client computer for said designated specific resources content.

20. A system as defined in claim 19 wherein said application has the application functions of print, save, cut/copy/paste, said protection data identifying various combinations of said functional operations which are disabled.

21. A system as defined in claim 19 wherein said server computer is adapted to selectively enable and disable said disabling predetermined functionality of said application for said designated specific resource content.

22. A system for controlling the operation of and access to selected computer resources of at least a first server computer by at least one subscriber client computer via an untrusted network in an operating session, wherein each of said subscriber client computers has a standard browser application for browsing the untrusted network, said first server computer being adapted to designate specific resource content as being protected and to provide predetermined protection data identifying said resource content as being protected when said data is transmitted to one of said subscriber client computers responsive to a request for said resource content, said data defining a hierarchical system of protection is being monitored by said subscriber client computer, and said subscriber client computer selectively disables predetermined application functions of the standard browser application previously installed on said subscriber client computer for said designated specific resource content responsive to said predetermined protection data from said first server computer.

23. A system as defined in claim 22 wherein said application has the application functions of print, save, cut/copy/paste, said protection data identifying various combinations of said functional operations which are disabled.

24. A method of controlling access to selected computer resources of at least a first server computer by at least one subscriber client computer via an untrusted network during an operating session, without necessarily controlling access to other computer resources provided by the first server computer and by other server computers and nonsubscriber client computers, comprising the steps of:

registering identity data of said first server computer and the identity data of each of said subscriber client computers and storing the registered identity data in a clearinghouse means associated with said first server computer and said subscriber client computers;

requiring a subscriber client computer to forward its identity data to said clearinghouse means at the beginning of an operating session in which access to selected computer resources is requested;

requiring a subscriber client computer to forward a predetermined digital identification to said first server computer to thereby confirm that a hardware key is connected to said subscriber client computer;

attempting to authenticate the identity of said subscriber client computer from said clearinghouse means responsive to a request for selected computer resources of said first server computer by a subscriber client computer;

attempting to authenticate the identity of said first server computer from said clearinghouse means responsive to said subscriber client computer making the request for selected computer resources; and, permitting access to said selected computer resources responsive to successful initial authentication of said first server computer and of said subscriber client computer making said request.

25. A method as defined in claim 24 wherein said subscriber client computer identity data includes a client name and a client password.

26. A method as defined in claim 24 wherein access is permitted subsequent to initial successful authentication only when said predetermined digital identification is forwarded to said clearinghouse means subsequently during an operating session by said subscriber client computer.

27. A method as defined in claim 24 wherein said untrusted network is the Internet.

28. A method as defined in claim 24 further including the steps of:

monitoring the communications between said first server computer and each subscriber client computer during operating sessions;

acquiring and storing usage data relating to said communications.

29. A method as defined in claim 28 further including the step of:

acquiring and storing demographic data on each client computer.

30. A method as defined in claim 28 further including the step of:

acquiring and storing billing data based upon the subscriber client computer's usage of server computer resources.

31. A method as defined in claim 24 wherein said first server computer can change the predetermined digital identification of a hardware key connected to a subscriber client computer.

* * * * *

UNITED STATES PATENT AND TRADEMARK OFFICE
CERTIFICATE OF CORRECTION

| | |
|---|---|
| PATENT NO. | : 6,516,416 B2 |
| DATED | : February 4, 2003 |
| INVENTOR(S) | : Gregg et al. |

It is certified that error appears in the above-identified patent and that said Letters Patent is hereby corrected as shown below:

<u>Title page,</u>
Item [56], References Cited, U.S. PATENT DOCUMENTS, insert the following references:

| | | | | |
|---|---|---|---|---|
| -- | 4,864,494 | 9/1989 | Korbus | 713/200 |
| | 4,885,789 | 12/1989 | Burger et al. | 380/25 |
| | 4,962,449 | 10/1990 | Schlesinger | 713/200 |
| | 5,032,979 | 7/1991 | Hecht et al. | 713/201 |
| | 5,204,961 | 4/1993 | Barlow | 713/201 |
| | 5,371,794 | 12/1994 | Diffie et al. | 380/21 |
| | 5,373,561 | 12/1994 | Haber et al. | 380/49 |
| | 5,416,842 | 5/1995 | Aziz | 380/30 |
| | 5,428,745 | 6/1995 | de Bruijin et al. | 713/201 |
| | 5,442,708 | 8/1995 | Adams, Jr. et al. | 380/49 |
| | 5,444,782 | 8/1995 | Adams, Jr. et al. | 380/49 |
| | 5,483,596 | 1/1996 | Rosenow et al. | 380/25 |
| | 5,485,409 | 1/1996 | Gupta et al. | 713/200 |
| | 5,499,297 | 3/1996 | Boebert | 380/25 |
| | 5,502,766 | 3/1996 | Boebert et al. | 380/25 |
| | 5,511,122 | 4/1996 | Atkinson | 380/25 --. |

<u>Column 32,</u>
Line 51 and before line 52, insert -- funcs=init-isa,restrict-by-isa,log-end,restrict-by-rpa --.

<u>Column 33,</u>
Line 25, delete "fh" and insert -- fn --.

<u>Column 34,</u>
Line 13, delete "ID".

Signed and Sealed this

Twenty-second Day of July, 2003

JAMES E. ROGAN
*Director of the United States Patent and Trademark Office*